(12) United States Patent
Nihal et al.

(10) Patent No.: US 6,205,138 B1
(45) Date of Patent: Mar. 20, 2001

(54) BROADBAND ANY POINT TO ANY POINT SWITCH MATRIX

(75) Inventors: Perwaiz Nihal, Fishkill; Robert Alan Flavin, Yorktown Heights, both of NY (US); Thompson Baum Vesecky, Essex Junction, VT (US); Norbert George Vogl, Mahopac; Edward Payson Clarke, Jr., Ossining, both of NY (US); Luis Rodriguez-Cortes, Annapolis, MD (US); Geoffrey Hale Purdy, Roxbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/066,209

(22) Filed: Apr. 24, 1998

(51) Int. Cl.[7] .................................................. H04L 12/50
(52) U.S. Cl. .................................... 370/388; 333/1; 333/5
(58) Field of Search ...................................... 370/430, 431, 370/388, 477, 215, 276; 333/1, 5, 144, 84; 335/152, 112; 348/569, 570, 6, 7, 16; 455/140, 4.2, 129, 280, 349, 84; 375/216, 219, 295; 379/93.06, 93.07, 93.14; 710/131

(56) References Cited

PUBLICATIONS

"Understanding Power Splitters", Mini–Circuits, P.O. Box 350166, Brooklyn, New York 11235, pp. 2–3 to 2–5.
"Single Pole Double throw (SPDT) Switch", Philips Semiconductors RF Communications Products, Oct. 10, 1991, pp. 1268–1277.

Primary Examiner—Wellington Chin
Assistant Examiner—Prenell Jones
(74) Attorney, Agent, or Firm—Louis J. Percello

(57) ABSTRACT

This invention is a broadband matrix switch system and method of operation. The broadband matrix switch has N number of broadband inputs, each of the broadband inputs having one or more broadband signals. The matrix switch has M number of broadband outputs. There are N number of splitters. Each of the splitters has a splitter input connected to one of the broadband inputs. Each of the splitters has M number of splitter outputs that produce the splitter output signal. There are N times M number of node switches. Each node switch is uniquely connected to one of the splitter outputs. The node switches have a control input that allows the node switch to pass the respective splitter output signal upon receiving a close command at the control input and to terminate the respective splitter output signal with an input impedance upon receiving an open command at the control input. There are M number of combiners. Each combiner has a combiner output connected to one of the broadband outputs. Each combiner further having N number of combiner inputs. Each of the combiner inputs are connected to one and only one of the inputs through the respective splitter and node switch. The node switches terminate the combiner input with an output impedance upon receiving an open command. The matrix switch further has a controller that sends one or more open commands to selected node switches to connect one or more of the broadband inputs to one or more of the broadband outputs. The matrix switch has many uses in switching and monitoring and analyzing broadband networks, for example, cable TV networks.

20 Claims, 16 Drawing Sheets

590

NODE ↱ ↲ 517

| SWITCH STATE | | | | RESULT | |
|---|---|---|---|---|---|
| 545 | 550 | 555 | 560 | 515 | 520 |
| 545A | 550A | 555A | 560A | | |
| 0 | 0 | 0 | 0 | NONE | NONE |
| 0 | 0 | 0 | 1 | 12 | NONE |
| 0 | 0 | 1 | 0 | NONE | 12 |
| 0 | 0 | 1 | 1 | 12 | 12 |
| 0 | 1 | 0 | 0 | 11 | NONE |
| 0 | 1 | 0 | 1 | 11&12 | NONE |
| 0 | 1 | 1 | 0 | 11 | 12 |
| 0 | 1 | 1 | 1 | 11&12 | 12 |
| 1 | 0 | 0 | 0 | NONE | 11 |
| 1 | 0 | 0 | 1 | 12 | 11 |
| 1 | 0 | 1 | 0 | NONE | 11&12 |
| 1 | 0 | 1 | 1 | 12 | 11&12 |
| 1 | 1 | 0 | 0 | 11 | 11 |
| 1 | 1 | 0 | 1 | 11&12 | 11 |
| 1 | 1 | 1 | 0 | 11 | 11&12 |
| 1 | 1 | 1 | 1 | 11&12 | 11&12 |

BROADBAND ANY POINT TO ANY POINT SWITCH MATRIX

FIELD OF THE INVENTION

This invention relates to the field of broadband switching.

More specifically, the invention relates to a broadband any point to any point switch matrix.

More specifically, the invention relates to a broadband switch matrix configuration.

BACKGROUND OF THE INVENTION

Broadband networks are systems of network components which receive and/or transmit broadband signals where the signals are analog waveforms within the 5 MHz (megahertz) to 1 GHz (gigahertz) frequency range; contain information encoded with analog modulation; and are combined through multiplexing (typically, frequency division multiplexing). These network components are interconnected through network connections. Examples of broadband networks include CATV/MATV (Community Access Television, Multiple Access Television) systems and data networks. A CATV/MATV system is typically composed of one or more "head-ends" which deliver television channels to a community of homes over an HFC (hybrid-fiber coax) infrastructure. The network components in a CATV/MATV broadband network include RF (radio-frequency) modulators, RF demodulators, frequency converters, band-pass filters, band-trap filters, combiners, splitters, taps, attenuators, equalizers, amplifiers, broadband switches, fiber-optic nodes, and metering equipment. These components are connected to each other through transmission lines which are typically coaxial cable.

Combiners and splitters perform complementary functions. Combiners sum two or more inputs which pass a range of frequencies to a common output. Inputs and outputs must have an electrical impedance that matches the source (input) or load (common output) over the combiners range of frequencies for the most efficient transfer of signal power. At the same time electrical isolation must be maintained between the inputs so that one input source does not pick up or transmit unwanted signal to any other input source. The splitter provides the complementary function of distributing a signal source at a single input to two or more outputs. The same impedance and isolation is required. See "Understanding Power Splitters . . . " published by Mini-Circuits and the CD22100 data sheet published by Harris Semiconductors which are herein incorporated by reference in their entirety.

The CATV/MATV systems are said to be broadband networks because the information which flows between the CATV/MATV network components is encoded in analog signals within the 5 MHz to 1 GHz range. The RF modulator components receive analog or digital signals containing information (such as audio and video information or digital data) in the baseband spectrum (below 5 MHz) and modulate the signals into the broadband spectrum. Each individual RF modulator will typically restrict the modulation of its input signals to within a six megahertz band, or television channel, of the broadband spectrum. Television channel 2, for instance, is the band of broadband spectrum between 54 MHz and 60 MHz. A television channel 2 modulator will modulate its audio and video into this range so that a connected television receiver (demodulator) can receive it. Demodulators listen to network connections for modulated signals within the broadband spectrum and convert the modulated signal into one or more demodulated output signals. The frequency range which the demodulators listen to is typically coordinated with the frequency range that one or more modulators are broadcasting on so that a demodulator tuned to the spectrum range of 54 MHz to 60 MHz (channel 2), for instance, will demodulate and output the signals (such as audio and video or data signals) which were modulated by a connected channel 2 modulator. A fiber-optic node is another network component which generates and receives broadband information. These nodes up-convert signals on a given range of the broadband spectra (such as 5 MHz to 50 MHz) into the optical frequency spectrum for transmission over optical media such as fiber-optic cable. The nodes can also receive signals on a given range in the optical frequency spectrum and down-convert the signals into the broadband spectrum for transmission over a broadband network. Fiber-optic nodes are often used to interconnect with optical fiber, two or more broadband networks which are separated over long distances.

Many of the network components are directional in nature, that is, they receive broadband signals, perform a function over the broadband spectrum, and retransmit the altered signals. Frequency converters translate the signals in a given range of the broadband spectrum into a second range of the broadband spectrum. Amplifiers are used to rejuvenate signals which have decayed due to transmission losses. Band-pass filters attenuate signals (typically noise) in a given range of the broadband spectrum and attenuators attenuate signals over the entire broadband spectrum. Equalizers compensate for frequency dependent decay of signals over long distances of transmission lines (network connections).

Broadband networks are often used in a bi-directional manner. Through frequency multiplexing, for instance, the broadband spectrum is often segmented into forward and reverse frequencies. One standard used in CATV/MATV systems is that the frequencies from 54 MHz to 750 MHz are used as forward frequencies and the frequencies within 5 MHz to 50 MHz are used for return information. CATV/MATV head-ends will broadcast television channels such as channel 2 (54–60 MHz) in the forward frequencies to their subscribers homes and receive data from the subscribers in the return frequencies. Data from the subscribers can be video signals modulated to a television channels (such as a video signal from a town-hall or sports event), information sent from individual subscriber's set-top boxes, or digital computer information sent from cable modems. Typically, return transmissions from the subscribers are coordinated through time-domain-multiplexing so that a transmission (television channel, set-top box signal, digital data signal) from one subscriber will not interfere with a transmission from another.

In broadband networks we want to switch and isolate different network connections so that the same broadcast network can be used to communicate between any one or more points to any other points. i.e. traffic (bandwidth) management can be done by combining network connections with limited bandwidth needs together and isolating networks connections with high bandwidth requirements. As the number of RF connections to be switched increases the difficulty of maintaining isolation also increases. This is because the RF signal conductors must be in close proximity for the various switching combinations to take place. However, it is this proximity which causes the conditions for RF leakage of unwanted mixing of signals.

Common matrix switching is done point to point, that is each input connects to only one output. The user is assured one source will be loaded by one and only one load. In generally known point to point switching systems, combining more than one input to an output is, by definition, not possible. Nor is splitting of a single input into more than one output. Further, common matrix switches cannot combine separate bands of different frequencies on multiple inputs into a single band of different frequencies on one or more outputs.

STATEMENT OF PROBLEMS WITH THE PRIOR ART

In broadband networks we want to switch and isolate different network connections so that the same broadcast network can be used to communicate between any one or more points to any other points. i.e. traffic (bandwidth) management can be done by combining network connections with limited bandwidth needs together and isolating networks connections with high bandwidth requirements. This cannot be done effectively within the prior art.

OBJECTS OF THE INVENTION

An object of this invention is an improved broadband switching system and method.

An object of this invention is an improved broadband system and method that can dynamically switch from any one or more first points on a broadband network to any one or more second points on a broadband network.

An object of this invention is an improved broadband system and method that maintains a loss invariant with respect to any number of first switched points switched to any number of second switched points.

SUMMARY OF THE INVENTION

This invention is a broadband matrix switch system and method of operation. The broadband matrix switch has N number of broadband inputs, each of the broadband inputs having one or more broadband signals. The matrix switch has M number of broadband outputs. There are N number of splitters. Each of the splitters has a splitter input connected to one of the broadband inputs. Each of the splitters has M number of splitter outputs that produce the splitter output signal. There are N times M number of node switches. Each node switch is uniquely connected to one of the splitter outputs. The node switches have a control input that allows the node switch to pass the respective splitter output signal upon receiving a close command at the control input and to terminate the respective splitter output signal with an input impedance upon receiving an open command at the control input. There are M number of combiners. Each combiner has a combiner output connected to one of the broadband outputs. Each combiner further having N number of combiner inputs. Each of the combiner inputs are connected to one and only one of the inputs through the respective splitter and node switch. The node switches terminate the combiner input with an output impedance upon receiving an open command. The matrix switch further has a controller that sends one or more open commands to selected node switches to connect one or more of the broadband inputs to one or more of the broadband outputs. The matrix switch has many uses in switching and monitoring and analyzing broadband networks, for example, cable TV networks.

BRIEF DESCRIPTION OF THE DRAWINGS

The foregoing and other objects, aspects and advantages will be better understood from the following detailed description of preferred embodiments of the invention with reference to the drawings that are include the following:

FIG. 5B is a table showing the possible input/output combinations of the 2×2 matrix switch shown in FIG. 5A.

DETAILED DESCRIPTION OF THE INVENTION

The description of FIGS. 1 through 4, below, describe a novel node switch that is used in the present invention and that is further described and claimed in the patent application entitled "Broadband Node Switch" that is filed on the same day as this application with the same inventorship and is herein incorporated by reference in its entirety.

Figure 1:
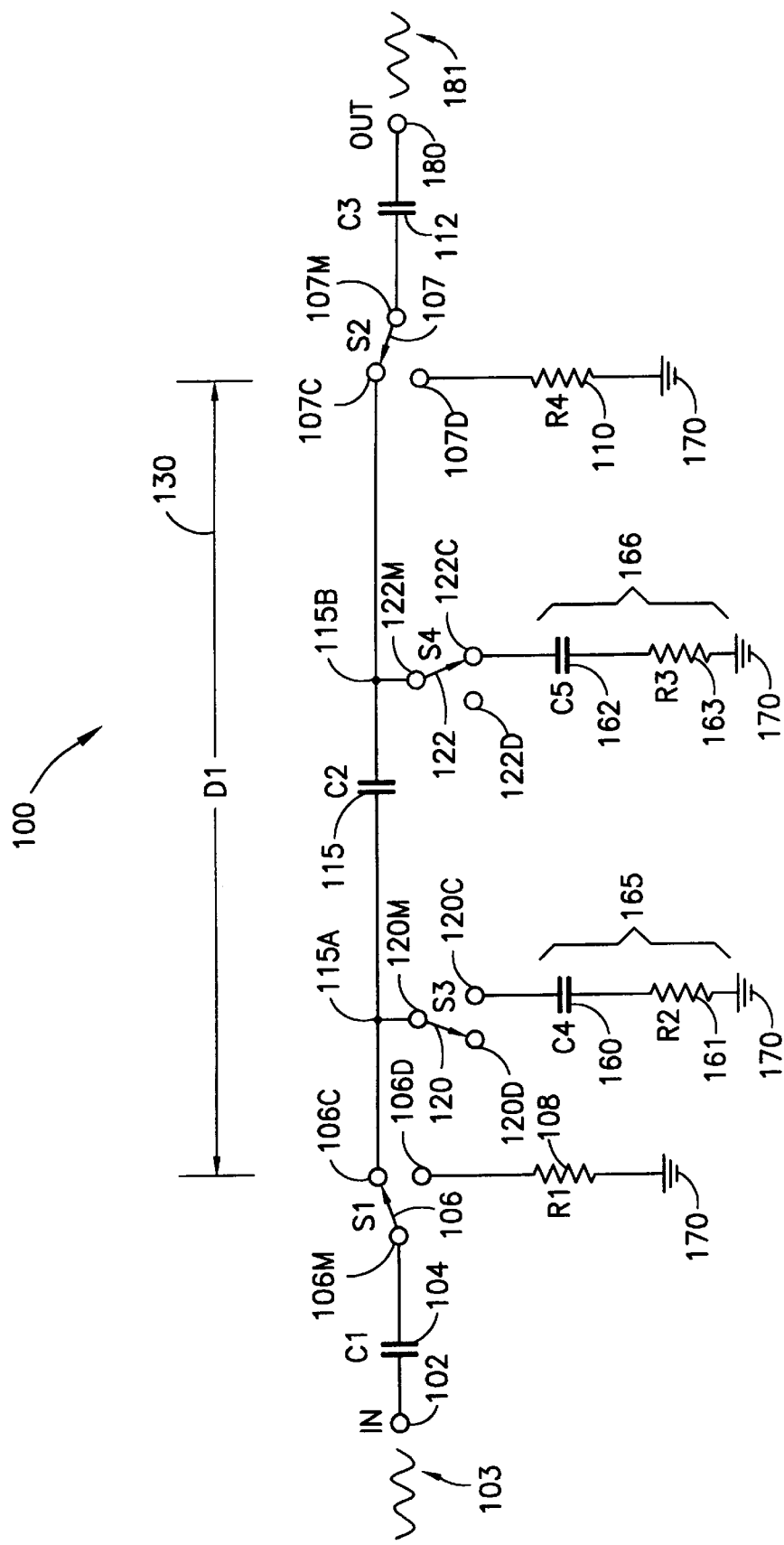
FIG. 1 is a general circuit diagram of a novel broadband node switch.

FIG. 1 is a general circuit diagram 100 of a novel (preferably a bi-directional) broadband node switch connecting/disconnecting inputs 102 having possible broadband input frequencies 103 to outputs 180 having possible broadband output frequencies 181. This invention is a broadband node switch 100 which has two states: connect and disconnect. In the connect state, an input disconnect switch 106 and an output disconnect switch 107 connect their respective commons (106M, 107M) through their respective connect poles (106C, 107C) to connect the input 102 through the input blocking capacitor 104, the DC blocking capacitor 115, and the output blocking capacitor 112 to the output 180. In the disconnect state, the input 106 and output 107 disconnect switches connect their respective commons (106M, 107M) to their respective disconnect poles (106D, 107D) thereby connecting the input 102 (output 180) and input 104 (output 112) blocking capacitor 104 through input 108 (output 110) loads to ground 170. Further, when the input disconnect switch 106 and output disconnect switch 107 are in the disconnect state, the DC blocking capacitor 115 is electrically isolated from the input 102 and the output 180. To prevent the DC blocking capacitor 115 and its connections (115A, 115B) from radiating undesirable broadband frequencies, one or more first link switches 120 and/or one or more second link switches 122 connect their respective commons (120M, 122M) through a respective first link load 165 and second link load 166 to ground 170 when the node switch 100 is in the disconnect position. (Various embodiments of the link loads (165, 166) include a direct wire connection, a capacitive connection, or a resistive (161, 163) and capacitive (160, 162) connection). This also causes the DC blocking capacitor 115 and its attached elements (115A, 115B) to become part of the ground plane 170 and therefore eliminating the capacitor 115 and its connected elements (115A, 115B) as either a capacitive or a transmitting electrical connection between the input 106 and output 107 disconnect switches. This is done by ensuring that a minimum physical distance 130 between the input disconnect switch 106 and the output disconnect switch 107 is at ground plane 170 potential with respect to the broadband frequencies. Note that when the node switch 100 is in the connect state, the first 120 and second 122 link switches have their respective commons (120M, 122M) connected to their respective disconnect poles (120D, 122D). Note that the input disconnect switch 106 and the output disconnect switch 107 in practical cases are separated by a maximum distance 130 which is determined by packaging considerations and transmission line considerations for a maximum distance 130 greater than one wavelength.

Figure 2:
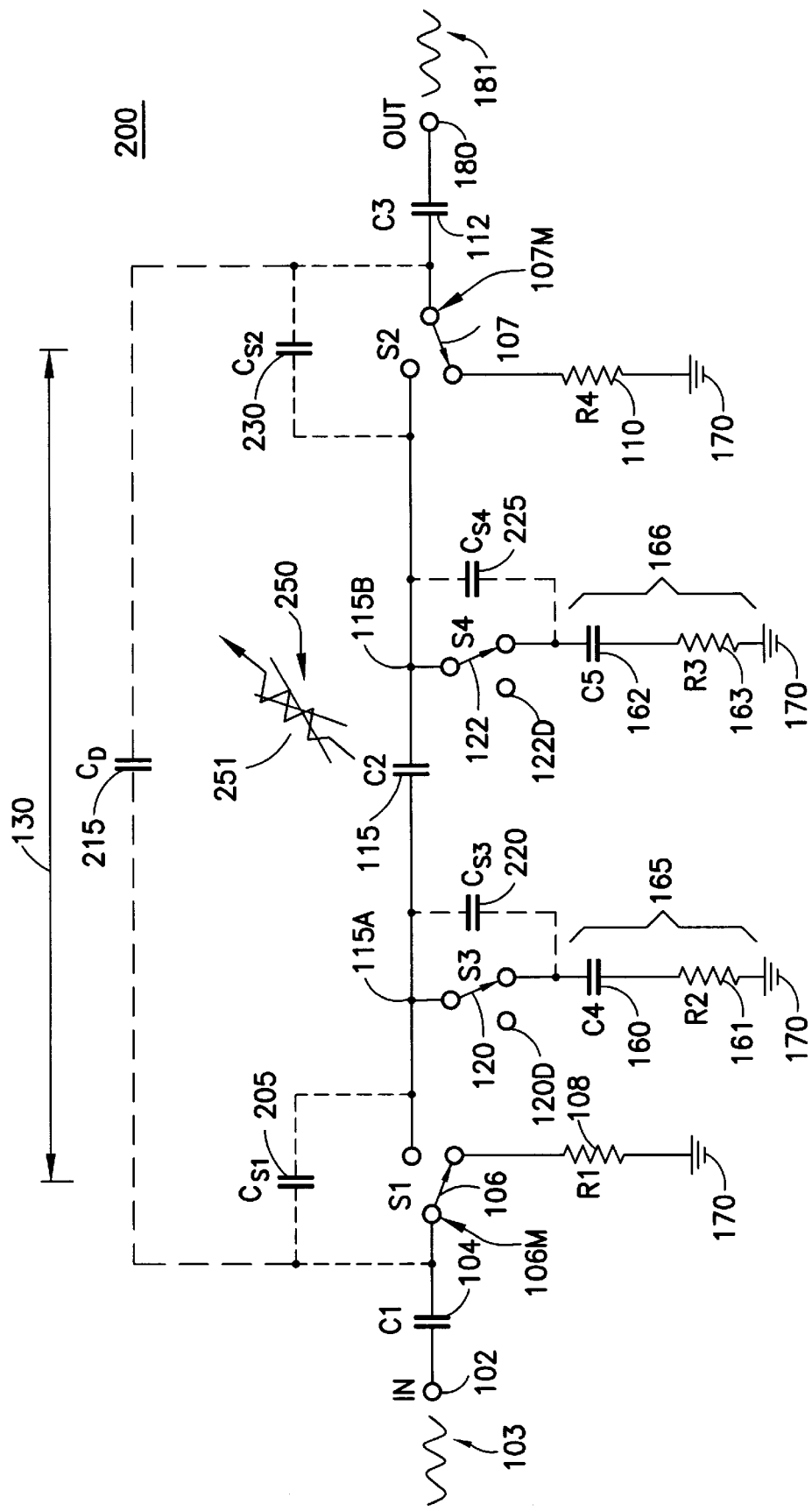
FIG. 2 is an equivalent circuit diagram of the novel broadband node switch in the open position.

FIG. 2 is an equivalent circuit diagram 200 of the novel bi-directional broadband node switch 100 in the open position (disconnect state) showing stray capacitances (205, 215, 220, 225, 230) in the broadband range. The input disconnect switch 106 has a stray capacitance 205. The output disconnect switch 107 has a stray capacitance 230. The first link switch 120 has a stray capacitance 220. The second link switch 122 has a stray capacitance 225. In addition, there is a capacitance 215 between the input disconnect switch 106 and the output disconnect switch 107. If the node switch consisted of only one disconnect switch 106, the stray capacitance 205 associated with the switch 106 would cause frequency signals (103, 181) to leak through the stray capacitance 205 when the switch 106 is in the open position (disconnect state). Due to the stray capacitance, the disconnection would not be effective over many of the broadband frequencies.

One novel feature of this invention causes the commons (106M, 107M) of the disconnect switches (106, 107, respectively) to be grounded 170 through an input/output load (108, 110) when the input (output) disconnect switches (106, 107) are in the disconnect state (open position). In this way, any frequencies that pass through the respective stray capacitances (205, 215, 230) will bypass the disconnect switches (106, 107) through the respective input/output loads (108, 110) and will bypass through the first (second) link switches (120, 122) through the respective link loads (165, 166) to ground 170. Therefore, much less of the input 103 or output 181 frequencies pass through the node switch 100 when it is in the disconnect state.

Another novel feature of this invention is that there are two disconnect switches (106, 107) which are separated by a minimum distance 130. Therefore, when the node switch 100 is in the disconnect state (open position), the distance between the switches (106, 107) reduces the amount of stray capacitance 215 between the commons (106M, 107M) of the disconnect switches. As a result, the impedance between these commons (106M, 107M) within the broadband frequency range increases so that less of the broadband frequencies (103, 181) leak through the switch.

A third novel feature of this invention is that the DC blocking capacitor 115 and one or more of its associated electrical elements (115A, 115B) are also connected to ground 170 through the first 120 and/or second 122 link switches through the respective link loads (165, 166). In this way, the DC blocking capacitor 115 and its electrical elements/connections (115A, 115B) do not act as a radiant element in the broadband range. Therefore, any radiant energy 250 that might be generated by the DC blocking capacitor 115 and its electrical elements/connections (115A, 115B) are connected to ground 170 by the link switches (120, 122). Furthermore, in the disconnect state of the node switch 100, the DC blocking capacitor 115 act as an additional element of the ground plane 170 to ensure electrical isolation between the disconnect switches (106, 107) by reducing the stray capacitance 215.

Note that when the switch is in the connect state (closed position) the commons (120M, 122M) of the link switches (120, 122) are connected to their respective disconnect poles (120D, 122D) and their respective stray capacitances (220, 225) provide a small leakage path to ground 170. However, the effect of these stray capacitances (220, 225) does not affect the operation of the node switch 100 because the link loads (165, 166) are chosen such that they offer a high impedance in this path (these paths) relative to the path of the DC blocking capacitor 115 which has a very low (characteristic) impedance in the broadband range.

Figure 3:
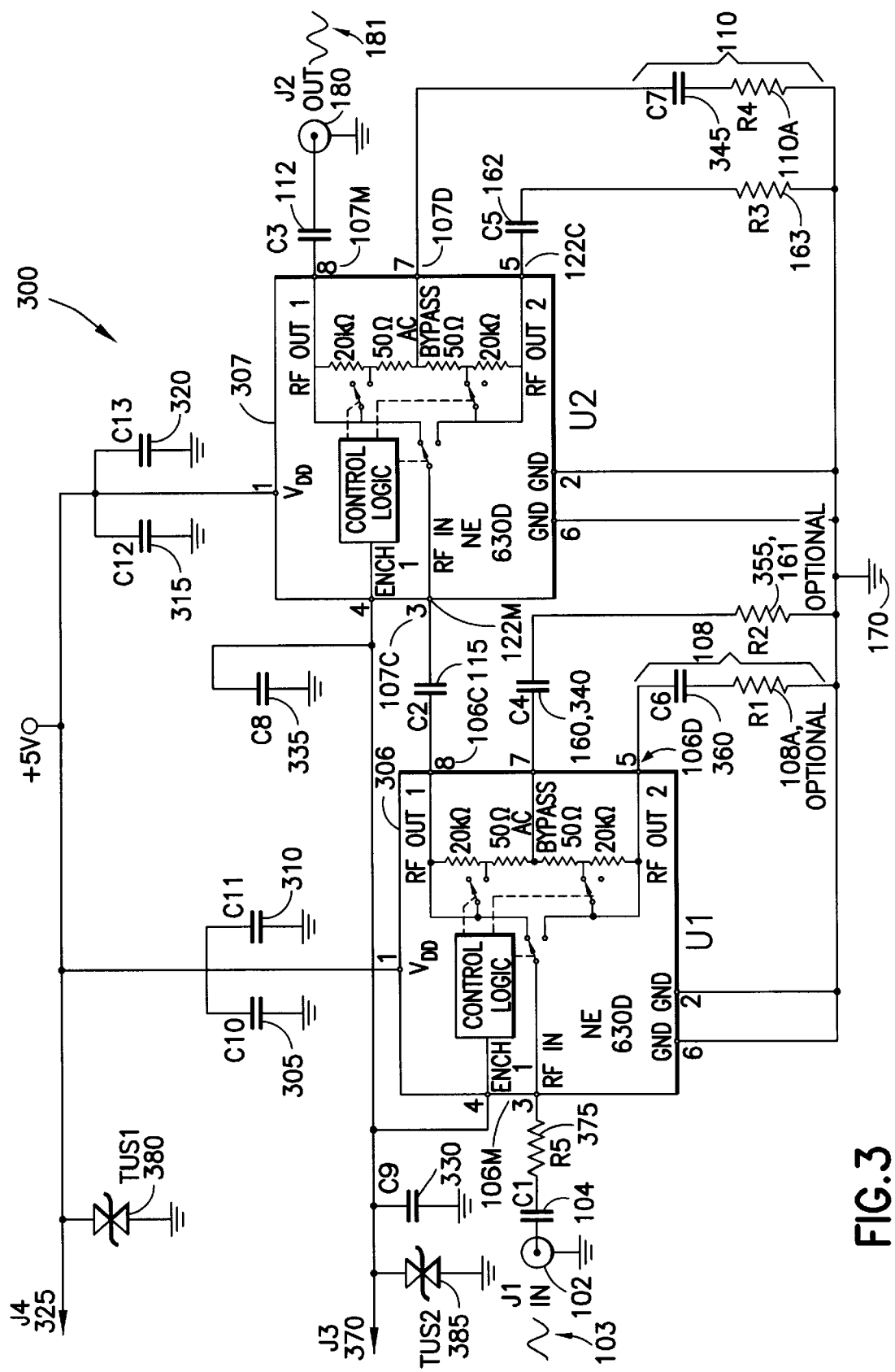
FIG. 3 is a detailed circuit diagram of one preferred embodiment of the broadband node switch.

FIG. 3 is a detailed circuit diagram 300 of one preferred embodiment of the bi-directional broadband node switch 100. In a non-limiting example of this circuit 300, a disconnect switch (e.g. 106, 107) and a link switch (e.g. 120, 122) are implemented in pairs and embodied by a general semiconductor single pole double throw (SPDT) switch. These switches can be any semiconductor broadband (or wideband) switch. In a preferred embodiment, these switches (306, 307) are high speed switches that endure a large number of cycles. However, for applications in video at 30 frames per second and nonessential data transmission, the time taken to transfer from the open to closed position (or back) should be on the order of 1/10 of a second. More preferably, the switch time would be less than 1/100 of a second. For more essential data (information) transmission or for general networking and TCP/IP communications, the switch time should be under 500 nanoseconds, more preferably, under 100 nanoseconds, and most preferably, under 30 nanoseconds. Note that for some applications, non-solid state switches like micro-relays can be used but the number of cycles would be more limited. Other embodiments of the switches (106, 107, 120, 122) include field effect transistors and high frequency polar transistors. In one preferred embodiment, the disconnect/link switch (306, 307) was a Phillips Semiconductor NE630D, or alternatively, the NE630N.

In the circuit diagram 300 of FIG. 3, new connection components have been added, however, those components that are the same as described in FIG. 1 will retain their numbers and perform the function as described in FIG. 1. Components 104, 112, 115, 160, 162, 165, 305, 315, 330, 335, 345, and 360 are 0.1 uf capacitors and components 310 and 320 are 0.01 uf capacitors. Note however that the requirements of the capacitors are that they block low frequency and DC components while passing various ranges of the broadband spectrum and as a result, these capacitor values can vary over a wide range. Components 161, 163 and, 375 are 24 ohm resistors and components 108A and 110A are 75 ohm resistors. In this preferred embodiment, all resistors (108A, 110A, 161, 163 and, 375) are chosen to match the characteristic impedance of the input and output connections (102, 180) over the broadband range for optimal power transmission and minimum reflections in both the connect and disconnect states of the switch. However, other values of resistance could be chosen. Components 380 and 385 are optional surge suppressers that short voltage components much above the supply voltage to ground. Surge suppressers are well known.

Positive DC voltage enters the circuit 300 through power line 325 to power the disconnect/link switches (306, 307). Capacitors 310 and 320 of 0.01 uf (or equivalent) are connected between the power line 325 and ground 170 in close proximity to the power supply pin of each disconnect/link switch (306, 307) and serve to suppress high frequency noise. Capacitors 305 and 315 are 0.1 uf (or equivalent) and are connected between the power line 325 and ground 170 in close proximity to the power supply pin of each disconnect/link switch (306, 307) and serve to suppress low frequency noise. In alternative embodiments, one pair of these capacitors (305, 310 or 315, 320) may be omitted.

Line 370 is a digital control line connected to the control logic of the disconnect/link switches (306, 307). Optionally, a surge suppresser 385 is connects the line 370 to ground 170 to protect the circuitry from undesired voltage components. Capacitors 330 and 335 connect the line 370 to ground 170 to suppress noise at a higher frequency than the frequency of the control line logic. Note that the frequency of the control line logic is dependent on the application and the design of these capacitors is well known.

The broadband input frequencies 103 enter (output frequencies 181 leave) the bi-directional node switch 300 utilizing a standard 75 ohm connectors at the input 102 (output 180). In a preferred embodiment, inputs 102 and outputs 180 are GF-61-APC or NS-5662-1 Teflon P/C board connectors made by Gilbert Engineering Company of Glendale, Ariz. (Note that other characteristic impedances such as 50 ohm are envisioned which would result in use of more available components and simplification and/or elimination of some of the discrete resistors, e.g. 108A and 375, external to the disconnect/link switches 306 and 307).

The signal enters through a blocking capacitor 104 and through an optional impedance matching resistor 375 into the input disconnect/link switch 306 at its common connection 106M. Note that capacitor 104 is sized at 0.1 uf to block DC and low components from the signal input of the input disconnect/link switch 306 and that the impedance matching resistor 375 in combination with the internal resistance of the input disconnect/link switch 306 results in a characteristic input impedance of 75 ohm.

In one preferred embodiment using the NE 630 or SA 630 D for the input disconnect/link switch 306, an AC bypass resistor/capacitor network is used. The capacitor 340 is 0.1 uf and the resistor 355 is 25 ohm which in combination with the internal resistance of the switch 306 produces a 75 ohm characteristic impedance. The purpose of this resistor/capacitor network is used to maintain symmetric isolation between the connect pole 106C and the disconnect pole 106D of the input disconnect/link switch 306. Note that they are also ground connection to the input disconnect/link switch 306 and the output disconnect/link switch 307.

The input disconnect/link switch 306 common 106M connects to the connect pole 106C when the switch 306 is in the connect (closed) state. This switch position connects the common 106M through the DC blocking capacitor 115 to the RF input of the NE 630 D (or equivalent) of the output disconnect switch 307 which in the output switch 307 is the output switch 307 connect pole 107C.

The input disconnect/link switch 306 common 106M connects to the disconnect pole 106D when the switch 306 is in the disconnect (open) state. In the disconnect state, the common 106M is connected through the input load 108 to ground 170. In one preferred embodiment, the input 108 (output 110) load comprises a series resistor 108A (110A) and capacitor 360 (345) network. The resistor has a value of 75 ohms which provides the characteristic impedance to match and terminate the input 102. The capacitor 360 have a value of 0.1 uf to provide a block to DC and low frequency voltages.

The input disconnect/link switch 306 and the output disconnect/link switch 307 are controlled by the control input 370 to be in the disconnect (open position) state at the same time and to be in the connect (closed position) state at the same time.

In the connected (closed position) state of the output disconnect/link switch 307, the signals (103) entering the connected pole 107C of the output disconnect/link switch 307 passed to the common 107M of the output disconnect/link switch 307 and through the blocking capacitor 112 to the output terminal 180. Further, in the connected state the connect pole 107C is isolated from the output disconnect/link switch 307 disconnect pole 107D and the AC bypass. Note that in this configuration, the AC bypass pin connection of the NE 630D (SA 630D) is used as the disconnect pole 107D and the RF out 2 (122C) connection is terminated with the output link load 166. (Note that in the case of the output, the common 122M of the output link switch 122 is electrically the same as the common 107C of the output disconnect switch 307.)

In the disconnect (open position) state of the output disconnect/link switch 307, the signals (181) entering the output 180 are connected to ground 170 through the common 107M, 50 ohms of internal resistance, out the AC Bypass 107D (disconnect pole), and through external resistor 110A (which has a value of 24 ohms to combine with the internal resistance to form the characteristic impedance and terminate the output 180).

Figure 4:
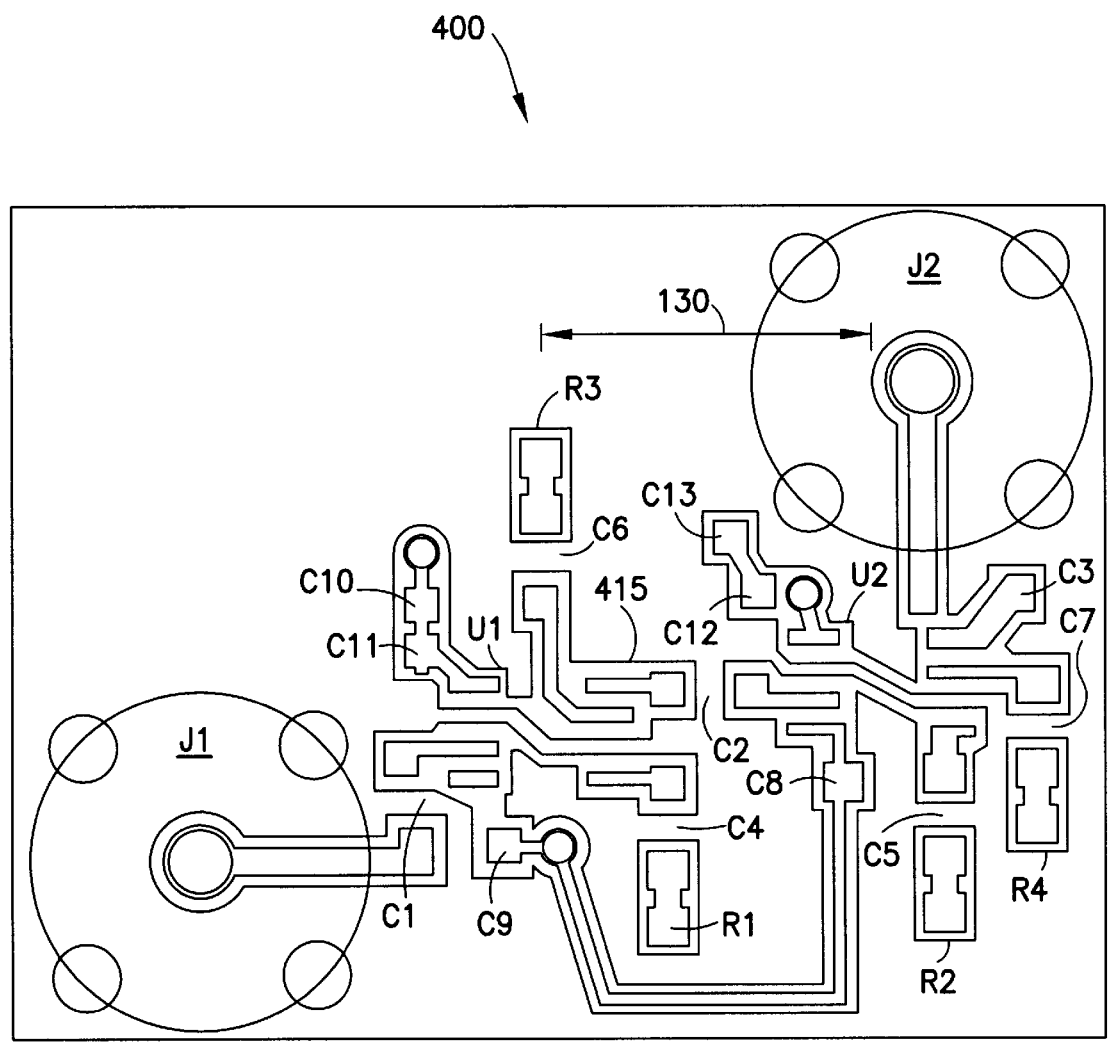
FIG. 4 is a preferred circuit layout of the broadband node switch.

FIG. 4 is one preferred circuit board layout 400 of the broadband node switch 100. The physical separation 130 of the disconnect/link switches (306, 307) is shown. It is apparent that this invention allows for a much greater physical separation between the input 102 and output 180 than would be provided by a single disconnect switch resulting in much greater electrical isolation. The area 415 is that which becomes grounded when the node switch 100 is in the disconnect state which further ensures electrical isolation of the input 102 and output 180. The components in layout 400 have the same identifying notation as in FIG. 3.

The description of the novel point to point broadband switch matrix is now presented.

Figure 5A:
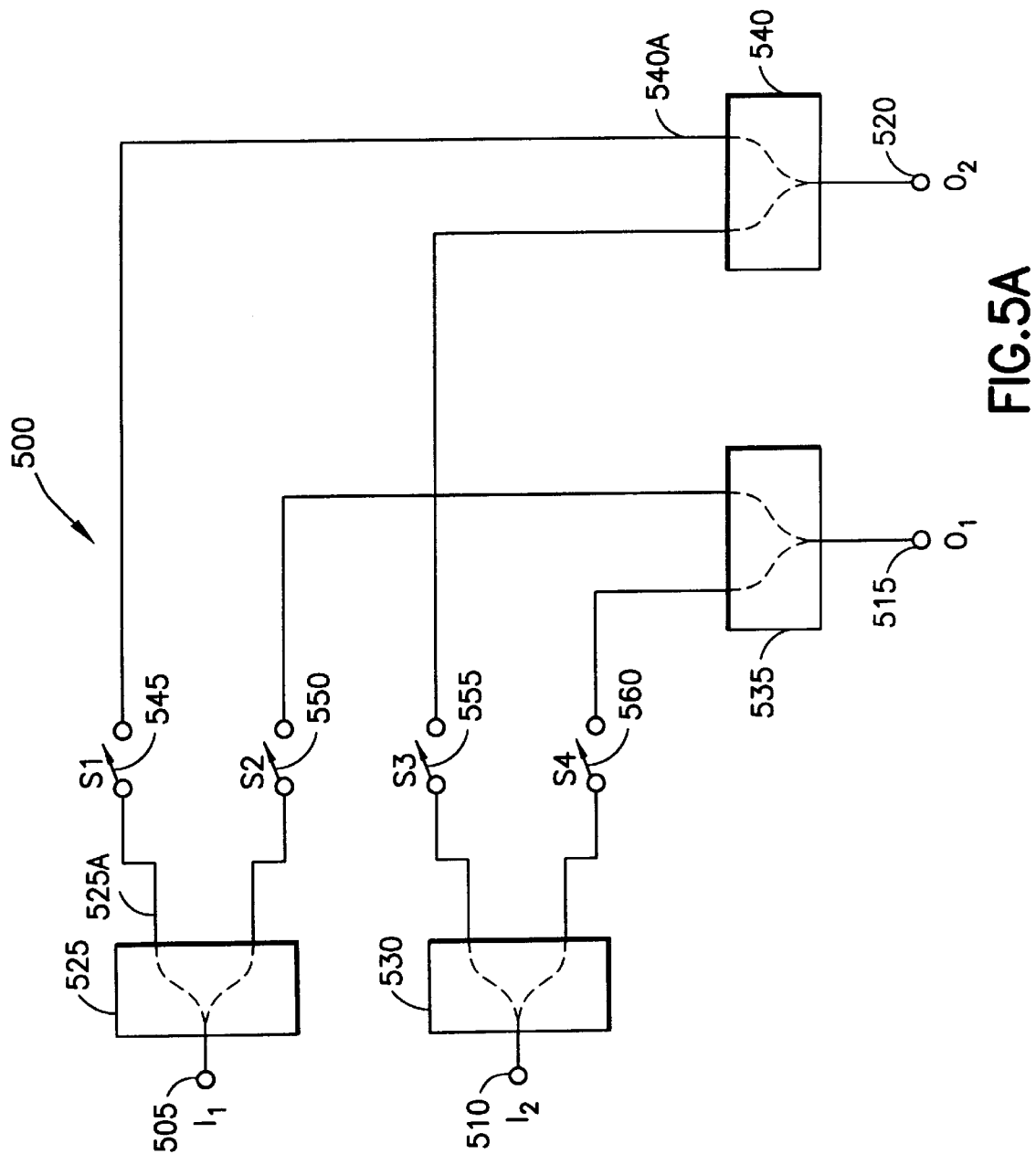
FIG. 5A is a block diagram of a 2×2 version of a novel matrix switch.

FIG. 5A is a block diagram of a 2×2 version of a novel matrix switch 500 which is given as a non-limiting example of a more general case that will be described below. Blocks 525 and 530 are splitters and blocks 535 and 540 are combiners. The splitters (525, 530) are any generally available and known splitters that operate over the bandwidth of the switch. For example, in one preferred embodiment, a Toner XGVS-8 eight-to-one broadband splitter operating within the range of 5–1000 MHz is used. The combiners (535, 540) are any generally available and known combiners that operate over the bandwidth of the switch. For example, in one preferred embodiment, the same Toner XGVS-8 eight-to-one broadband splitter component is used as a combiner. Blocks 545, 550, 555, and 560 are node switches 100, more preferably 300, as described above in FIGS. 1–4. I1 (505) and I2 (510) are inputs to the splitters 525 and 530, respectively. O1 (515) and O2 (520) are outputs of the combiners 535 and 540, respectively.

Note that each splitter output produces a splitter output signal that is essentially equal to a fraction of the broadband signal appearing at the splitter input. This is due to losses in the splitter and the fact that the splitter splits the signal into M number of isolated outputs. Similarly, each combiner output produces a combiner output signal that is essentially an equal fraction of the combined broadband signal appearing at the combiner inputs. Again, this is due to losses in the combiner and the fact that the combiner combines the signals from N number of isolated inputs.

In one preferred embodiment, the splitter (combiner) would have an input (output) equal to the line impedance of 75 ohms and would have outputs (inputs) equal to an impedance of 50 ohms. By doing this, standard and generally available 50-ohm components, e.g. 306, 307, could be easily matched to standard broadband line impedances. These 50-ohm components have packaging profiles that can make the physical matrix switch assembly more compact. These "impedance matching" splitters and combiners could be made by placing an impedance matching element on the input (output) of the splitter (combiner). Alternatively, the ratio of the windings of the transformer element in the splitter/combiners could be changed to accomplish this impedance matching.

In general, every output of each splitter (e.g. 525, 530) is connected through a node switch (100, 300) uniquely to one and only one input of one of the combiners (e.g. 535, 540). More specifically, in a preferred embodiment, each splitter (525, 530) is connected to every combiner (535, 540) by one and only one splitter output (e.g. 525A) through a single node switch 100 (e.g. 545) to a single combiner input 540A of one and only one respective combiner (e.g. 540). Conversely, in a preferred embodiment, each combiner (535, 540) is connected to every splitter (525, 530) by one and only one combiner input (e.g. 540A) through a single node switch 100 (e.g. 545) to a single splitter output 525A of one and only one respective splitter (e.g. 525). In this example, there are two (e.g. N=2) inputs (505, 510) and two (e.g. M=2) outputs (515, 520). However, by changing the number of splitter outputs and/or the number of combiner inputs, the number of inputs (N) and the number of outputs (M) can be changed as described in more detail below. Note that the number of node switches 100 (300) will be N times M and will vary due to these alternative switch configurations.

FIG. 5B is a table 590 showing all possible input/output combinations of the example 2×2 matrix switch 500 shown in FIG. 5A. This table 590 will be used in conjunction with FIG. 5A to show the operation of this non-limiting example. Table 590 has records, e.g. 565, that each contain the following fields: a node switch state (e.g. 545A) for each respective node switch 100/300 (e.g. 545); and a result 517 for each of the outputs (e.g. 515 and 520) in this example. Note that for a given record 565, the node switch states (e.g. 545A, 550A, 555A, and 560A) for each of the node switches (545, 550, 555, 560, respectively) constitute the state of the matrix switch 500 called the matrix switch state. Therefore, each record 565 shows the matrix switch state 565A and the result 517 that the matrix switch state 565A causes on each of the outputs (e.g. 515, 520). In this table, a "0" indicates a node switch 100 (300) state of open/disconnected and a "1" indicates a node switch 100 (300) state of closed/connected. For example, for matrix switch state 565A the record 565 indicates that node switch 545 has an open state 545A, node switch 550 has an open state 550A, node switch 555 has an closed state 555A, and node switch 560 has an open state 560A. Therefore, the matrix switch state 565 causes the output 515 to be disconnected from both of the inputs (I1/505, I2/510) and the output 520 to be connected to the input I2/510. Table 590 shows all possible matrix switch states (e.g. 565) that produce any combination of input (505, 510) and output (515, 520) connections.

As further examples, matrix switch state 565B connects the output 515 to only input I1/505 and connects output 520 to both input I1/505 and input I2/510. Alternatively, matrix switch state 565C connects the output 515 to both input I1/505 and input I2/510 and connects output 520 to both inputs I1/505 and I2/510.

Therefore, using this matrix switch 500 any input (e.g. 505, 510) can be connected to any output (e.g. 515, 520) by changing the matrix state (e.g. 565) by varying the node switch states (e.g. 545A). Accordingly, the broadband matrix switch 500 (and 600 below) can dynamically switch from any one or more first input points on a broadband network to any one or more second output points on a broadband network by dynamically controlling the node switch states (e.g. 545A). For example, the node switch states (e.g. 545A) are controlled by placing a control signal on line 370 (FIG. 3, above).

Figure 6:
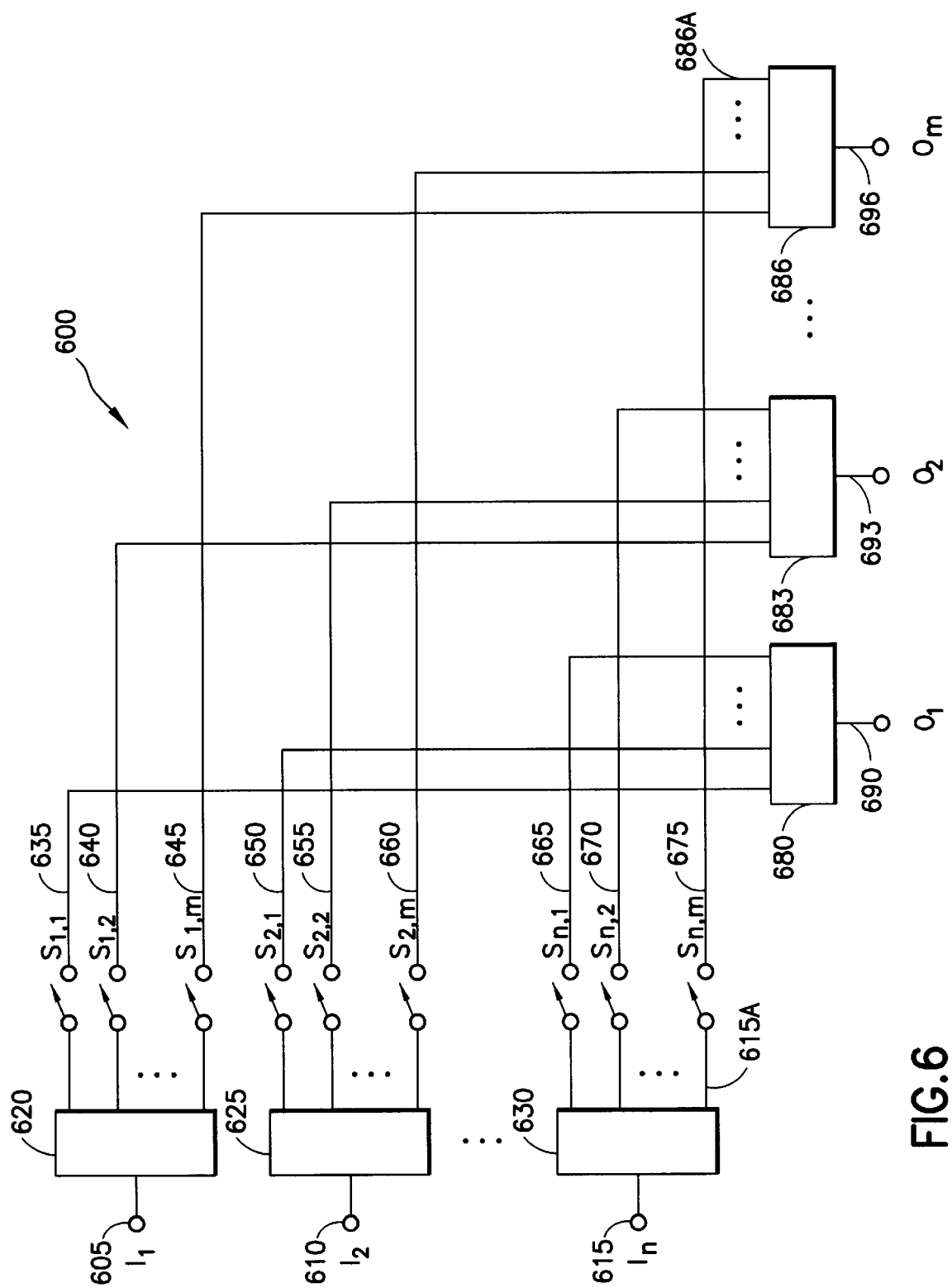
FIG. 6 is a block diagram of an N×M version of the novel matrix switch.

FIG. 6 is a block diagram of a general N×M matrix switch 600. In this general switch 600, every output, typically 615A, of each splitter (e.g. 620, 625, 630) is connected through a node switch (100/300, here shown as 635, 640, 645, 650, 655, 660, 665, 670, and 675, and hereafter referred to by the typical node switch 675) uniquely to one and only one input (typically 686A) of one of the combiners (e.g. 680, 683, 686). More specifically, in a preferred embodiment, each splitter, typically 630, is connected to every combiner, typically 686, by one and only one splitter output (e.g. 615A) through a single node switch, typically 675, to a single combiner input, typically 686A, of one and only one respective combiner, typically 686. Conversely, in a preferred embodiment, each combiner, typically 686, is connected to every splitter, typically 630, by one and only one combiner input, typically 686A, through a single node switch, typically 675, to a single splitter output, typically 615A of one and only one respective splitter, typically 630. In this example, there are N inputs (605, 610, 615) and M outputs (690, 693, 696). Note that the number of node switches 100 (300) will be N times M.

In this general matrix switch 600 N×M configuration, each splitter, typically 630, has M number of splitter outputs, typically 605, and each combiner, typically 686, has N number of combiner inputs, typically 686A. Further, there are N splitters, typically 630, and M combiners, typically 686.

Therefore, using this N×M matrix switch 600 and the principals described in FIGS. 5A and 5B, any input, typically 615, can be connected to any output, typically 696, by changing the matrix state (e.g. 565) by varying the node switch states (e.g. 545A). Accordingly, the broadband matrix switch 600 can dynamically switch from any one or more first input points on a broadband network to any one or more second output points on a broadband network by dynamically controlling the node switch states (e.g. 545A). For example, the node switch states (e.g. 545A) are controlled by placing a control signal on line 370 (FIG. 3, above).

Note further that since each splitter output, typically 615A, is a known fraction of the splitter input, typically 615, and each combiner output, typically 696, is a known fraction of the combiner input, typically 686A, and that the node switches 100 (300) terminates any unconnected input/output with a characteristic impedance in the preferred embodiment, any output 696 will be at a constant proportional power level with respect to a given input 615 power level, no matter how many inputs 615 are combined to appear at a given output 696. Thus, the matrix switch 600 equally attenuates any combination of inputs 615 at any given output 696.

Figure 7:
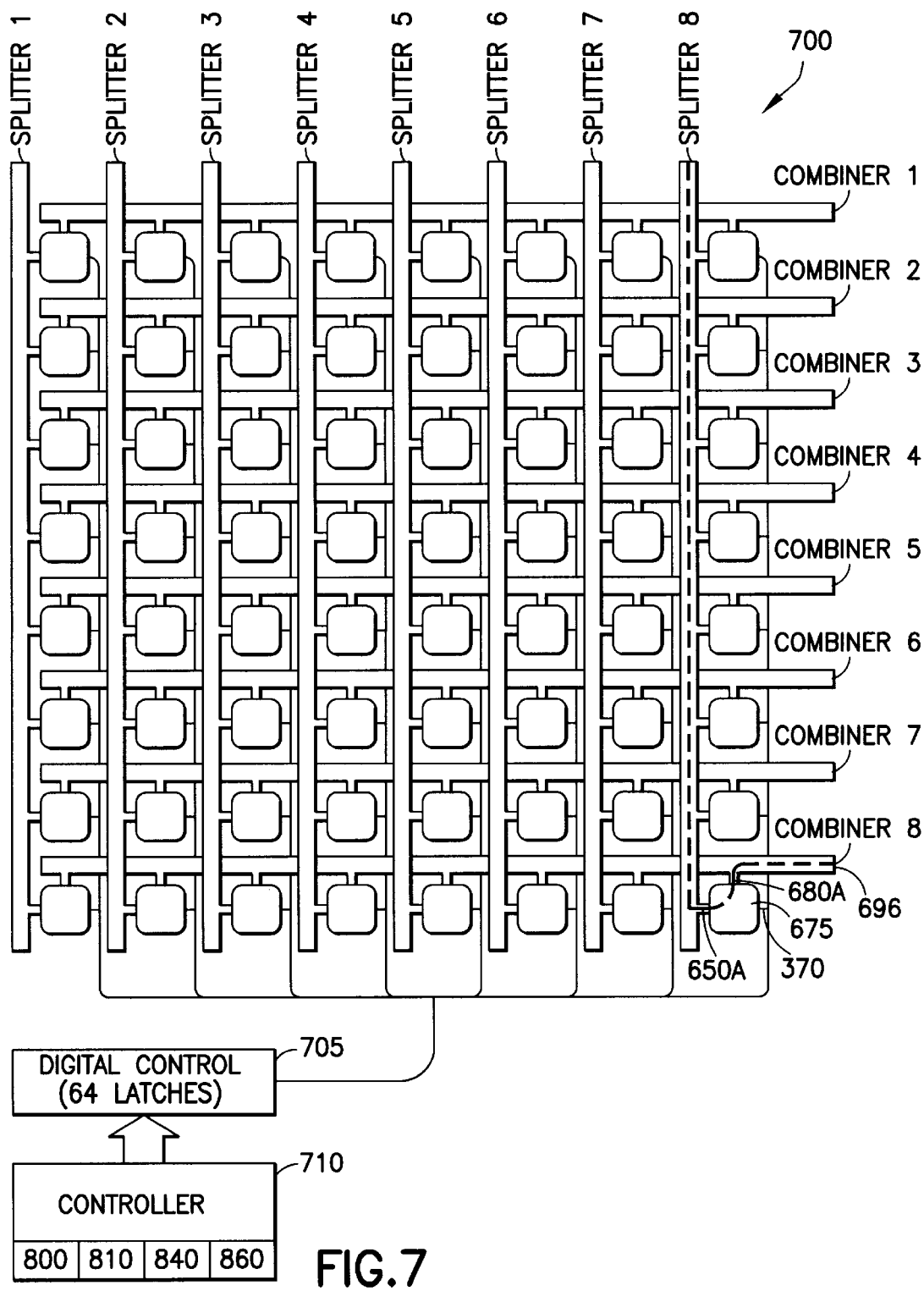
FIG. 7 is a block diagram showing a preferred interconnection between splitters, node switches, and combiners in a version of the N×M matrix switch.

FIG. 7 is a block diagram showing a preferred interconnection between splitters, node switches, and combiners in an 8×8 version of the N×M matrix switch. In this drawing, a controller 710 is shown controlling control lines, typically 370, through an optional digital control circuit 705. The operation of this configuration will be described using a non-limiting example of one node switch 675. In this example, input I8/650A enters the node switch 675 which connects the I8/650A input uniquely to output O8/696. When the node switch 100/300/675 is in the closed/connected state, the input I8/650A appears at the output O8/696. The node switch 675 state is controlled through the control line 370 by a controller 710. In a preferred embodiment, the controller 710 controls a bank of digital control latches 705 one of which causes the control line 370 of the node switch 675 to be in a 0 (disconnect) or 1 (connect) state. In a preferred embodiment, the digital control latch bank 705 is a IOE-DGL96 I/O Expansion Board for the Little Giant made by Z-World Engineering and the controller 710 is a Little Giant microcontroller also made by Z-World Engineering.

The purpose of the controller 710 is to provide control signals to each of the control lines 370 of the node switches 100 (300) in the matrix switch 600/700. Alternative embodiments of the controller 710 include manual switches, hardware logic, or any other known switching and/or controller means. In one preferred embodiment, the controller 710 is a computer which runs a controlling algorithm and/or other control functions. An example of one preferred embodiment of these computer algorithm/functions is given in FIGS. 8A through 8D below in the description of the set of pattern tables 800 and the algorithms 810, 840 and 860.

Figure 8A:
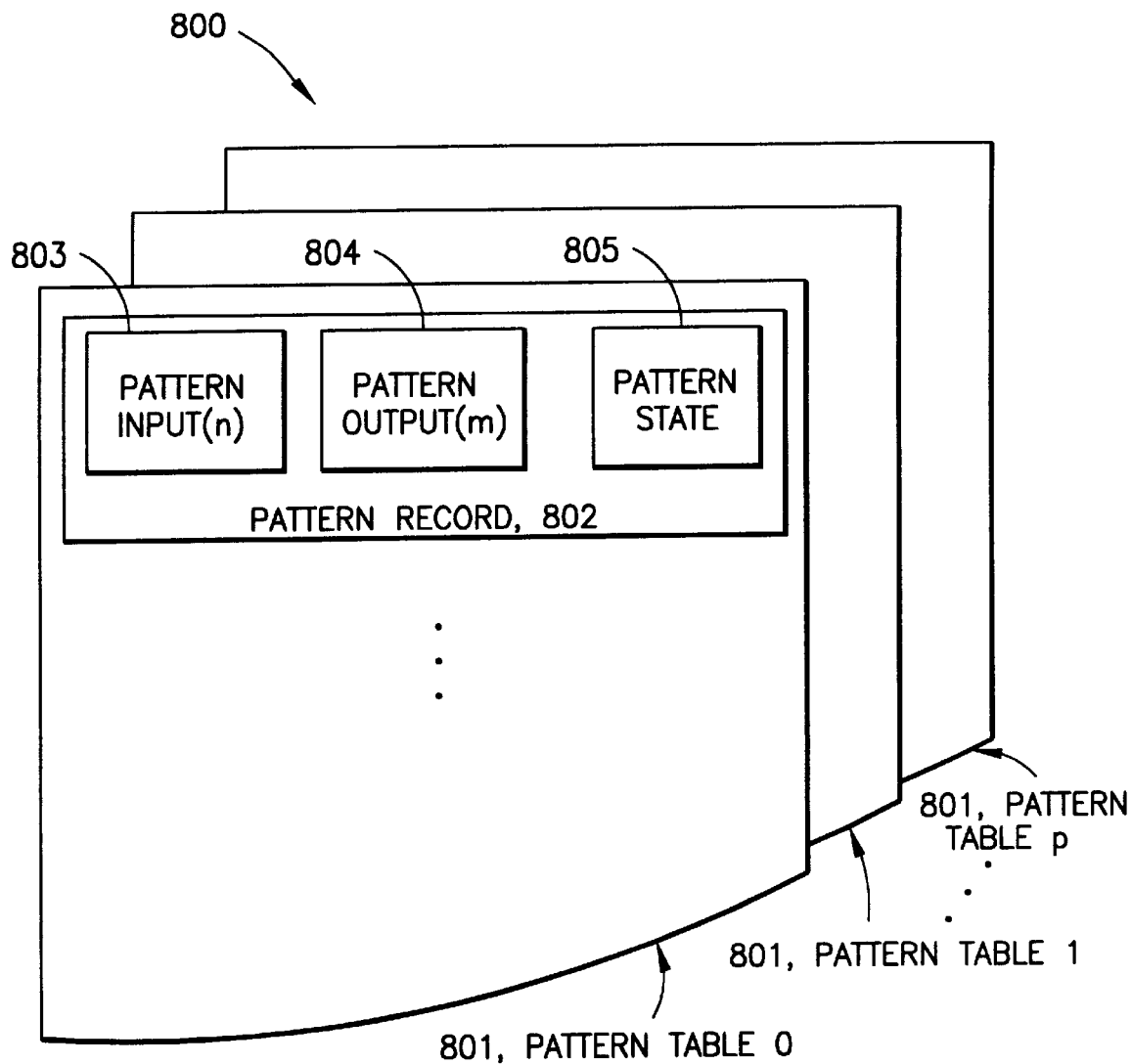
FIG. 8A is a data structure showing one or more pattern tables used to control the matrix switch.

FIG. 8A is a data structure showing a set 800 of one or more pattern tables 801 used to control the matrix switch (e.g. 600/700). Each pattern table 801 contains zero or more pattern records 802 each of which has a pattern input field 803 (specifying the n position of the node switch 100), a pattern output field 804 (specifying the m position of the node switch 100), and a pattern state field 805 (indicating the state of the selected switch 100 with position n, m). Pattern tables 801 are used to describe states of the matrix switch 600/700. Each pattern record 802 indicates the state (open/disconnected or closed/connected) of an individual node 100 within the matrix switch 600/700. The node switch 100 is uniquely identified in the pattern record 802 through the use of the pattern input 803 and pattern output 804 fields. The pattern state field 805 within the pattern record 802 holds one of two values: JOIN or REMOVE. A pattern record 802 which has a pattern state field 805 with a JOIN value indicates that the node switch 100 associated with the given pattern input 802 and pattern output 803 should be configured to be in the closed/connected state. Similarly, a pattern record 802 which has a pattern state field 805 with a REMOVE value indicates that the node switch 100 associated with the given pattern input 802 and pattern output 803 should be configured to be in the open/disconnected state.

Note that a pattern table 801 may or may not contain pattern records 802 for each and every node switch 100 in the matrix switch 600/700. Suppose, for example, a pattern table 801 contained two pattern records 802A and 802B, respectively. Suppose that the first record 802A has a pattern input field 803A with a value of "1", a pattern output field 804A with a value of "1", and a pattern state field 805A with a value of "JOIN". And, suppose that the second record 802B of the pattern table 801 has a pattern input field 803B with a value of "2", a pattern output field 804B with a value of "1", and a pattern state field 805B with a value of "REMOVE". Then, this pattern table 801 would describe the state of a matrix switch 600/700 where its first input is connected to its first output and its second input is disconnected from its first output, and where the state of all other connections (or disconnections) between all other combinations of inputs and outputs are unspecified.

In a preferred embodiment, a plurality of pattern tables 801 are stored in the memory of the matrix switch 700's microprocessor controller 710. In a preferred embodiment, ten pattern tables 801 are stored in the microprocessor controller 710 memory. One pattern table 801, called the current pattern table, stores a record of the current connections and disconnections made by the node switches 100 within the matrix switch 600/700. The remaining pattern tables 801 are used to group other switch configurations (sets of connections and disconnections of individual node switches 100) together. For example, if a first output of a matrix switch 600/700 is desired to be connected, in an exclusive fashion, to either a first input or a second input, then a pattern table 801 can be created which contains pattern records 802 as described above which connect the first switch input to the first switch output and disconnect the second switch input from the first switch output. And, a second pattern table 801, in a similar way, can be created which contains pattern records 802 to disconnect the first switch input from the first switch output and connect the second switch input to the first switch output. Hence, in this example, these two pattern tables 801 would show desired overall configurations of the matrix switch 600/700 with respect to the first switch output. Pattern tables 801 are used in processes 810, 840, and 860 of FIGS. 8B, 8C, and 8D, respectively, described below.

In a preferred embodiment, each pattern table 801 is implemented using the well known data structure of a variable length array. This implementation allows pattern tables which are empty or have few pattern records 802 to occupy a minimal amount of the microprocessor controller 710 memory and allows for fast identification and enumeration of pattern records 802 contained in a pattern table 801. In an alternative embodiment, each pattern table 801 is implemented with two two-dimensional arrays of dimensions of N×M with single bit elements. One bit array is used as a mask and the second bit array is used to indicate the state (state indicator) of a node switch 100 at a given n×m position. A set bit in the mask means that the corresponding bit in the state indicator array for the given node switch 100 in the position n×m holds correct state information (closed/connected/JOIN, open/disconnected/REMOVE). Further, that a set bit in the mask means that a record 802 exists for the given node switch 100. A cleared bit in the mask means that the pattern table 801 does not contain a pattern record 802 for the respective node switch 100 in the N×M position.

Other alternative embodiments use a combination of variable sized arrays and fixed sized arrays or other well known data structures to accomplish the same result.

Figure 8B:
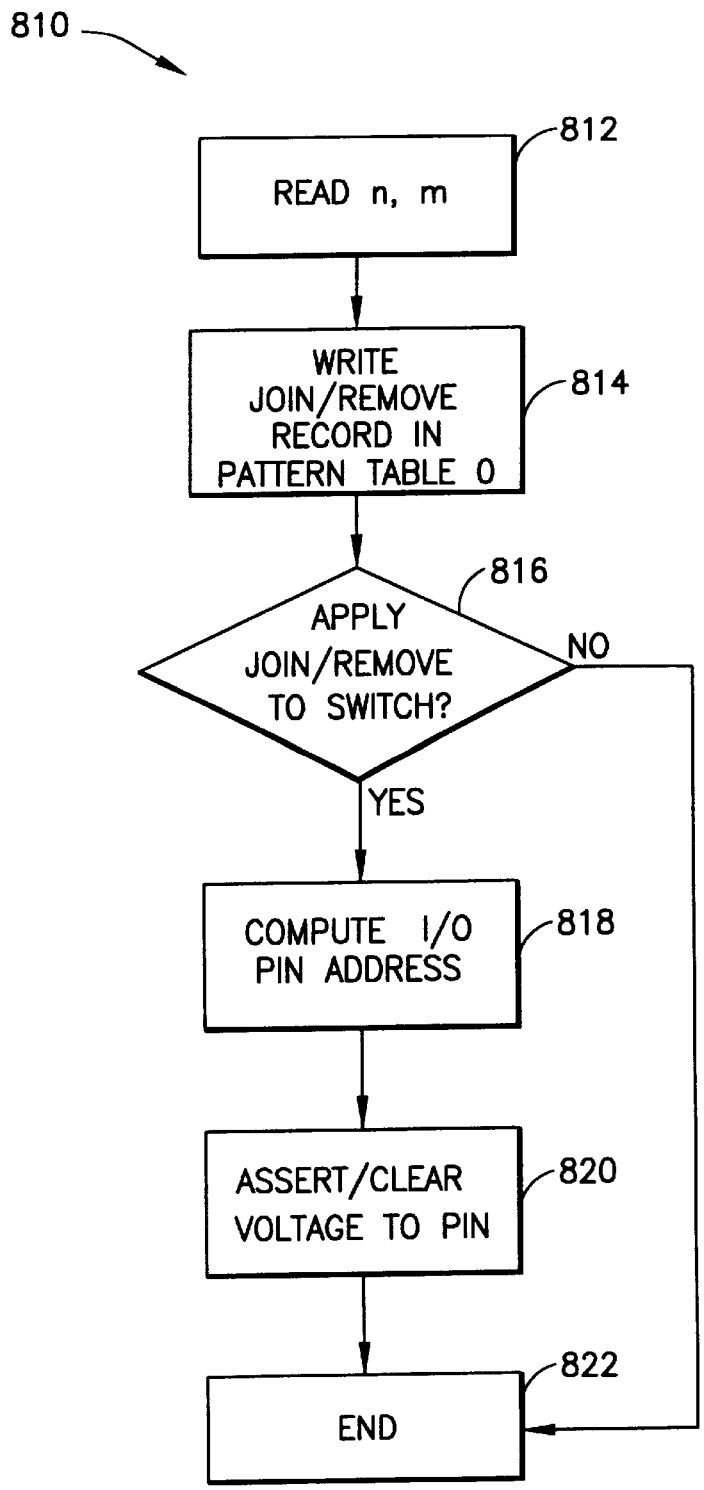
FIG. 8B is a flow chart of a processes executed to dynamically control the N×M matrix switch to join or remove a single connection between an input and an output (node switch) of the matrix switch.

FIG. 8B is a flow chart of a process 810 executed to dynamically control the N×M matrix switch 600/700 to join or remove a single connection between an input and an output (node switch 100) of the matrix switch 600/700. The process begins, step 812, by determining the index (input number/n, and output number/m), e.g. the location of the give node switch 100 to be opened or closed, of the connection to be opened or closed. In a preferred embodiment, the process 810 reads the indices from an external device using the well known communication protocol RS-232. The process 810 may also read the indices from a predetermined location in memory or off of a protocol stack when the process is invoked through steps 848 and 850 of process 840, FIG. 8C below. In a preferred embodiment, the indices (input/n, output/m) are identified as numbers. In alternative embodiments, mnemonic identifiers are read instead.

Once the input and output indices to a node switch 100 of the matrix switch 600/700 are determined, the process 810, step 814, writes a pattern record 802 into the current pattern table 801 (see FIG. 8A above). The pattern input field 803 of the pattern record 802 contains the input index, i.e. the n position of the selected node switch 100, determined in step 812. The pattern output field 804 of the pattern record 802 contains the output index, i.e. the m position of the selected node switch 100, determined in step 812. And, the pattern state field 805 of the pattern record 802 contains either a JOIN or a REMOVE value, depending on if the process 810 is connecting or disconnecting a node switch 100, respectively. If a pattern record 802 already exists in the current pattern table 801 for the determined node switch 100 indices, that pattern record 802 is overwritten with the new information. Otherwise, i.e. if no matching pattern record 802 exists, the pattern record 802 is added to the pattern table 801. Through this step 814, during the execution of the process 810, the current pattern table 801 is updated to maintain a record of the current connections and/or disconnections of those node switches 100 of the matrix switch 600/700 that are required to implement or build the pattern of the given pattern table 801.

After writing a pattern record 802 into the current pattern table 801, the process 810 then checks, step 816, to see if an actual node switch 100 within the matrix switch 600/700 should be placed into the open/disconnected or closed/connected state. The process 810 can, optionally, be invoked to record a connection or disconnection pattern record 802 in the current pattern table 801 and to not affect a change in a node switch 100. In a preferred embodiment, this step 816 checks the state of an auto-apply flag (see step 876, FIG. 8D below) and also checks how the process 810 was invoked. If the process 810 was invoked during execution of steps 848 or 850 from process 840, FIG. 8C below, then execution continues to step 818 where a connection or disconnection is made to the matrix switch 600/700. However, if the process 810 was invoked during execution of step 866, process 860, and the auto-apply flag is false, the process 810 skips steps 818 and 820 and execution branches to step 822. Otherwise, i.e. when the auto-apply flag is true and the process 810 was invoked during execution of step 866, process 860, execution continues to step 818. In a preferred embodiment, this check is made so that the JOIN or REMOVE pattern records 802 can be added to the current pattern table 801 without affecting the state of the node switches 100 in the matrix switch 600/700. Hence, it is possible, using one or more iterations of the process 810, to build the current pattern table 801 so that it contains a set of connections and disconnections which represent a configuration other than that of the state of selected switch nodes 100 in the matrix switch 600/700. This current pattern table 801 can then reflect desired future configurations of the matrix switch 600/700 and be used as a pattern for the contents of other pattern tables 801. In this mode, the pattern tables 801 are created for future use without affecting the configuration of the matrix switch 600/700. See step 874, FIG. 8D, below.

Note that in alternative embodiments, there may be no need to construct a current pattern table 801 which does not reflect the actual state of select node switches 100 in the matrix switch 600/700. In these embodiments, step 816 is omitted from process 810 and execution proceeds from step 814 to step 818.

In steps 818 and 820, the process 810 configures a selected node switch 100 of the matrix switch 600/700 into the connected or disconnected state. In step 818, the process 810 determines the address of the control line 910 (FIG. 9, below) which is connected to the node switch 100 indexed by the given input and output indices, step 812. In step 820, the control voltage 910 is asserted or removed from the identified control line 910. Assertion or removal of voltage is dependent on whether the process 810 is being invoked to process a JOIN/connect or REMOVE/disconnect. Control lines 910 and the steps performed to assert or remove voltage from them are well known. Execution of the process 810 then continues to step 822 where the process 810 ends.

Note that steps 814 and steps 816, 818 and 820 are independent of each other and can be performed in any order or in parallel.

Figure 8C:
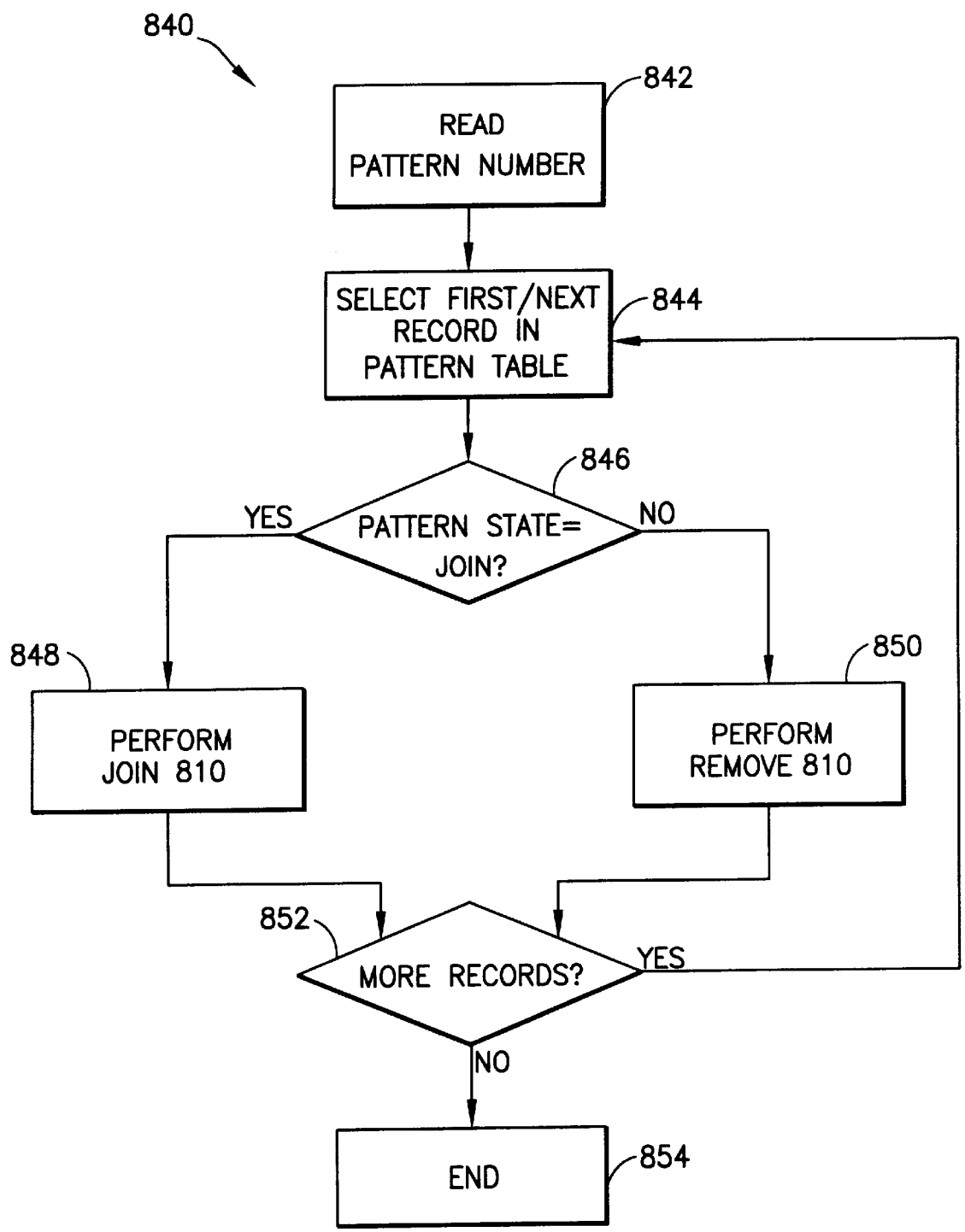
FIG. 8C is a flow chart of a process executed to dynamically control the N×M matrix switch to apply a pattern operation.

FIG. 8C is a flow chart of a process 840 executed to dynamically control the N×M matrix switch 600/700 to apply a pattern operation. This process 840, step 842, reads an identifier identifying a pattern table 801 which is stored in the memory of the microprocessor controller 710. Each pattern table 801 contains zero or more pattern records 802 to list a series of states (open/disconnected or closed/connected) for respective node switches 100 in the pattern. The process 840, steps 844 and 852, iterates through the selected pattern table 801 and examines the pattern state field 805 of each successive pattern record 802 (associated with a respective node switch 100) within the pattern table 801. If the pattern state field 805 contains a JOIN value, process 810 is invoked to configure the respective node switch 100 identified via the pattern input field 803 and the pattern output field 804 into an closed/connected state. Otherwise, process 810 is invoked to configure the node switch 100 identified via the pattern input field 803 and the pattern output field 804 into a open/disconnected state. After the process 840 has iterated through all pattern records 802 within the selected pattern table 801, the process 840 ends, step 854.

In a preferred embodiment, identification of the selected pattern table 801 is done by reading, step 842, a numeric identifier using the RS-232 communication protocol. In alternative embodiments, mnemonics, e.g. textual names identifying the pattern tables 801, are read through RS-232 or other well known communication protocols.

Note that, as described above, FIG. 8A, alternate embodiments of the pattern tables set 800 use a bit array data structure to maintain the pattern tables 801 in memory. In these embodiments, step 844 iterates over each byte (typically, group of eight bits) in the bit array. And, steps 846, 848, and 850 are done on a byte-wise level using the well known Boolean AND, OR, and XOR operations and conditionally change the configuration of a mass (typically eight) of switch nodes at one time.

Figure 8D:
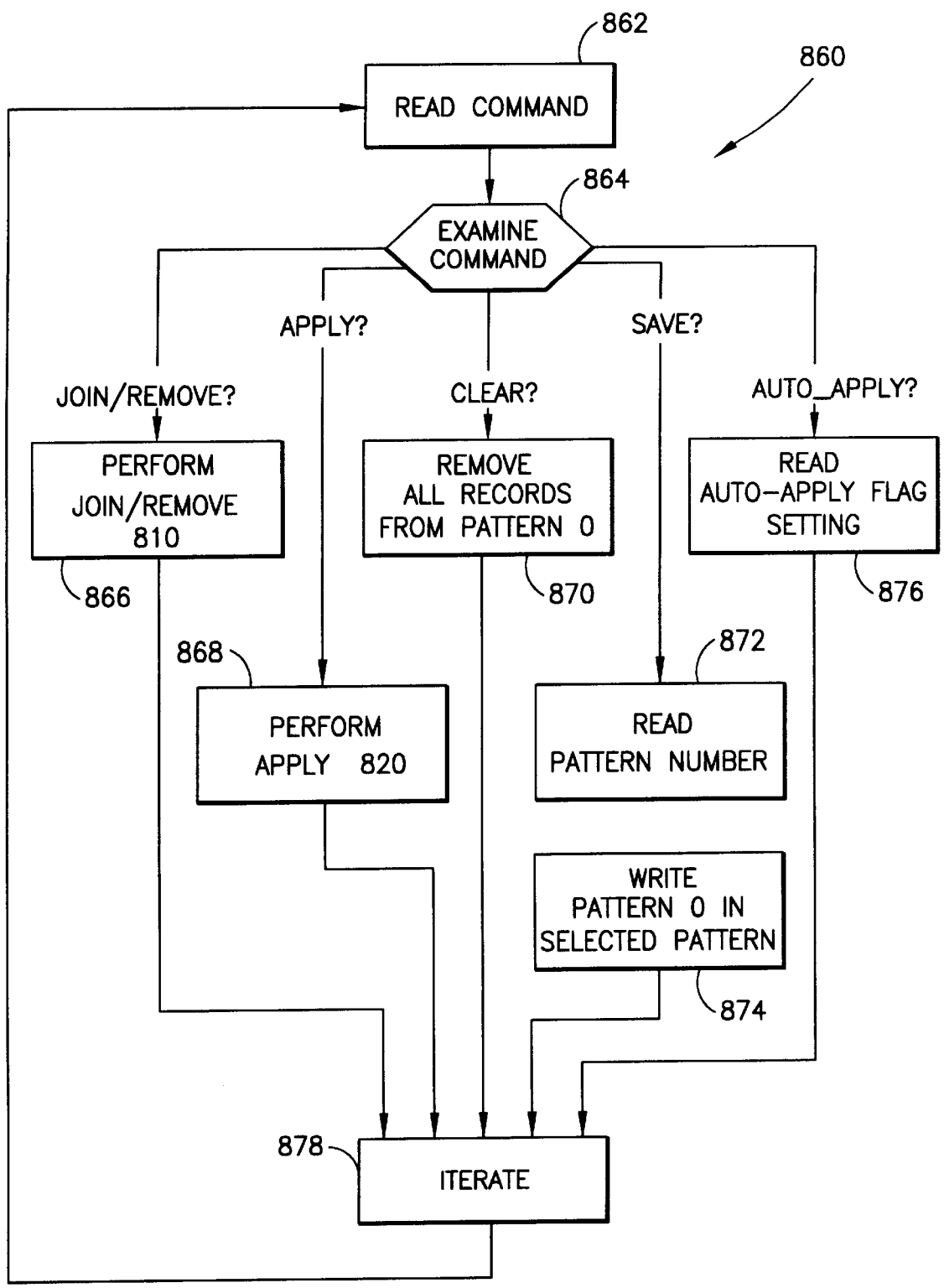
FIG. 8D is a flow chart of a command process executed to dynamically control the N×M matrix switch.

FIG. 8D is a flow chart of a command process 860 executed to dynamically control the N×M matrix switch 600/700. This process reads a command, step 862, through a well known communication protocol, e.g. RS-232, acts upon the command, steps 866, 868, 870, 872 (874), and 876, and then iterates, step 878, to read a next command, step 862. In a preferred embodiment, the commands read in step 862, are ASCII text commands, e.g. "JOIN", "REMOVE", "APPLY", . . . separated by a space or new-line character. In an alternative embodiment, the commands read in step 862 are predetermined byte (or bit) codes which distinguish the commands. For example, a control-J, i.e. ASCII code hex OA, signifies a JOIN command; and a control-R, i.e. ASCII code hex 12, signifies a REMOVE command.

After the command is read in, step 862, it is identified, step 864, and execution branches, conditionally, to the proper step. If the command was a JOIN command, execution branches to step 866 where process 810 is invoked to perform the JOIN operation. If the command was a REMOVE command, execution also branches to step 866 however, in this case, process 810 is invoked to perform a REMOVE operation. If the command was an APPLY command, execution branches to step 868 where process 840 is invoked and a selected pattern table 801 is applied to the matrix switch 600/700.

When the command is a CLEAR command, execution branches to step 870 where all entries, i.e. pattern records 802, in the current pattern table 801 (see FIG. 8A above) are removed from the current pattern table 801. When the command is a SAVE command, execution branches to step 872 where a pattern identifier is read in the same manner as step 842 of process 840, and execution continues to step 874 where the selected pattern table 801 is rewritten so that it contains an exact copy of the current pattern table 801. These two commands, CLEAR and SAVE, in conjunction with JOIN, and REMOVE, allow configurations of the matrix switch 700 to be written into the current pattern table 801 and copied into other pattern tables 801. Selected node switches 100 (selected and configured in a pattern table 801) in the matrix switch 600/700 can then be quickly and easily configured into these saved configurations starting from any arbitrary configuration through the APPLY command, process 840.

When the command read during step 862 is an AUTO-APPLY command, execution branches to step 876 where a value for the auto-apply flag (see process 810, FIG. 8B above) is set. Typically, this value is a Boolean identifier such as "1", "0", "ON", or "OFF". This value indicates if next JOIN and REMOVE commands should affect the state of the switch nodes 100 of the matrix switch 700 or if next JOIN and REMOVE commands should only alter the current pattern table 801. The value is checked in process 810, for example, the value is checked in process 810 to determine if the JOIN/REMOVEs are performed "on-line" or "off-line".

After steps 866, 868, 870, 874, or 876 are executed, the process 860 continues, step 878, back at step 862 again where a next command is read.

The following is a description of one preferred configuration of the novel switch matrix and is further described and claimed in the patent application entitled "Broadband Switch Matrix Configuration" that is filed on the same day as this application with the same inventorship and is herein incorporated by reference in its entirety.

Figure 9:
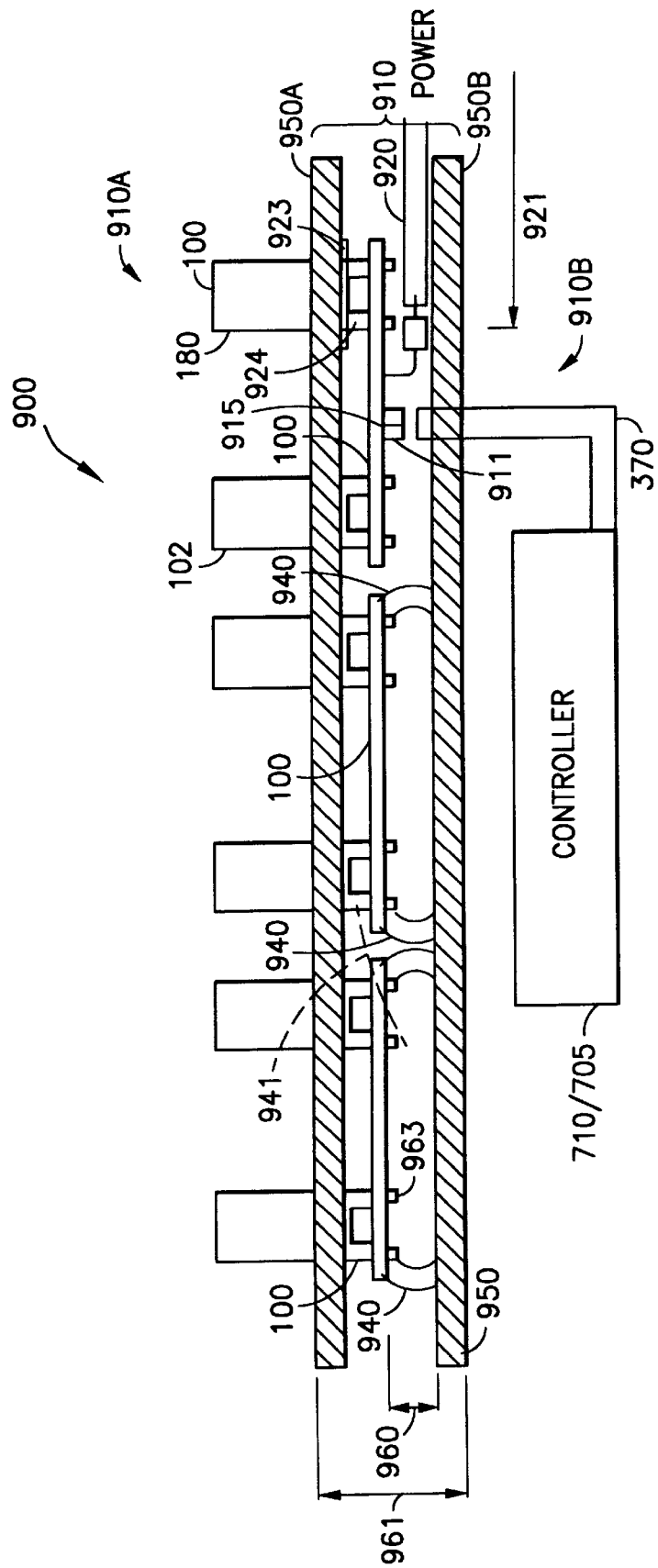
FIG. 9 is a cross sectional view of a matrix of node switches within the shielded chamber also showing how electric field lines of each node switch is modified by proximate ground planes to isolate the node switch signals.

FIG. 9 is a cross sectional view 900 of a matrix of node switches 100 (300) within a shielded chamber 910 also showing how electric field lines of each node switch 100 (300) is modified by proximate ground planes 950 to isolate the node switch signals. The node switches 100 (300) are mounted in a first conducting mounting plate 950A so that the input 102 and output 180 of the node switch 100 (300) protrude on an outside side 910A of the first conducting mounting plate 950A. The first conducting mounting plate 950A is at ground potential. The circuit and circuit board portions of the node switches 100 (300) are contained so that they are on an opposite side of the first conducting mounting plate 950A and accordingly are within the shielded chamber 910. A second conducting mounting plate 950B, also at a ground potential, is parallel to the first conducting mounting plate 950A at a distance 961 from the first conducting mounting plate 950A. Therefore, a shielded chamber 910 is created between the first and second conducting mounting plates (950A, 950B). In a preferred embodiment, the controller 710 and/or any required digital control logic 705 are located on the outside side 910B of the second conducting mounting plate 950B. In this manner, the circuitry of the node switches 100 (300) is all contained within the shielded chamber 910 so that interference from the broadband inputs 102 and outputs 180 and interference from the controller 710 and any required digital control logic 705 will not interfere with any of the signals in the node switches 100 (300) and vice versa. Further, the broadband inputs 102 and outputs 180 and the control signals produced by the controller 710 and optional digital control logic 705 are isolated from one another. Note that the digital controller 710 and optional digital control logic 705 could be mounted on the same side as the broadband signals 102, 180 but that this would reduce isolation and might cause some difficulty in the physical arrangement.

The separation 961 between the first and second conducting mounting plates (950A, 950B) is large enough to permit connecting access to the node switches 100 (300) and to prevent any short circuiting of the node switch 100 (300) components 963 by the first and/or second mounting plates (950A, 950B). However, the spacing 960 between the second conducting mounting plate 950B and the circuitry on each of the node switches 100 (300) has to be small enough to influence the electromagnetic fields 940 produced by the node switches 100 (300) so that the electromagnetic fields 940 are redirected toward the second (and first) conducting mounting plate 950B (950A) and not toward adjacent node switches 100 (300) as the electromagnetic fields would be 941 if the second conducting mounting plate 950B were too far away, i.e. the spacing 960 was too great. In this way, the effect of the electromagnetic fields 940 produced by any given node switch 100 (300) is greatly attenuated at the locations of the other node switches 100 (300). In a preferred embodiment, the spacing 960 is between 0.125 and 0.5 inches, more preferably 0.25 inches and the separation 961 is between 0.25 and 1.0 inches, more preferably 0.5 inches.

In a preferred embodiment, the first and second conducting plates (950A, 950B) are 0.125 inch thick sheet aluminum and form the central ground plane of the matrix switch 600.

In a preferred embodiment, the control lines 370 from the controller 710 and/or digital control logic 705 pass through the second conducting mounting plate 950B so that they connect to the respective node switch 100 (300) at a right angle 911 in all directions with respect to the plane of the circuit board of the node switch. This minimizes the coupling surface between the control line 370 and the connecting circuitry on the node switch 100 (300) so that coupling between the control signals entering line 370 and any broadband signals on the node switch 100 (300) are reduced to a minimum. In a preferred embodiment, the control connectors 370 are connected to the node switches 100 (300) by a push on connector and have shielding screw connected to the second conducting mounting plate 950B.

Power enters each of the node switches 100 (300) from an individual power connection 920 connected to the power bus. In a preferred embodiment, the power connectors 920 are shielded and the shields are connected 923 to their respective node switch 100 (300) by soldering the shield to a serrated washer which is inserted between the shoulder 924 of one of the input/output connectors 102, 180 and the first conducting mounting plate 950A. Therefore, by bolting the connector 102, 180 to the first conducting mounting plate 950A, the washer establishes a ground connection to both the first conducting mounting plate 950A and the respective node switch 100 (300). In one preferred embodiment, the power connectors 920 pass through the shielded chamber 920 to connect 325 to the node switches 100 (300) in parallel to the first and second conductive mounting plates 950A, 950B. In an alternative embodiment, the power connectors 920 pass through the first and/or second conductive mounting plates 950A, 950B and connect 325 to the respective node switches 100 (300) so that the connector is preferably perpendicular to the plane of the circuitry of the node switch.

Figure 10:
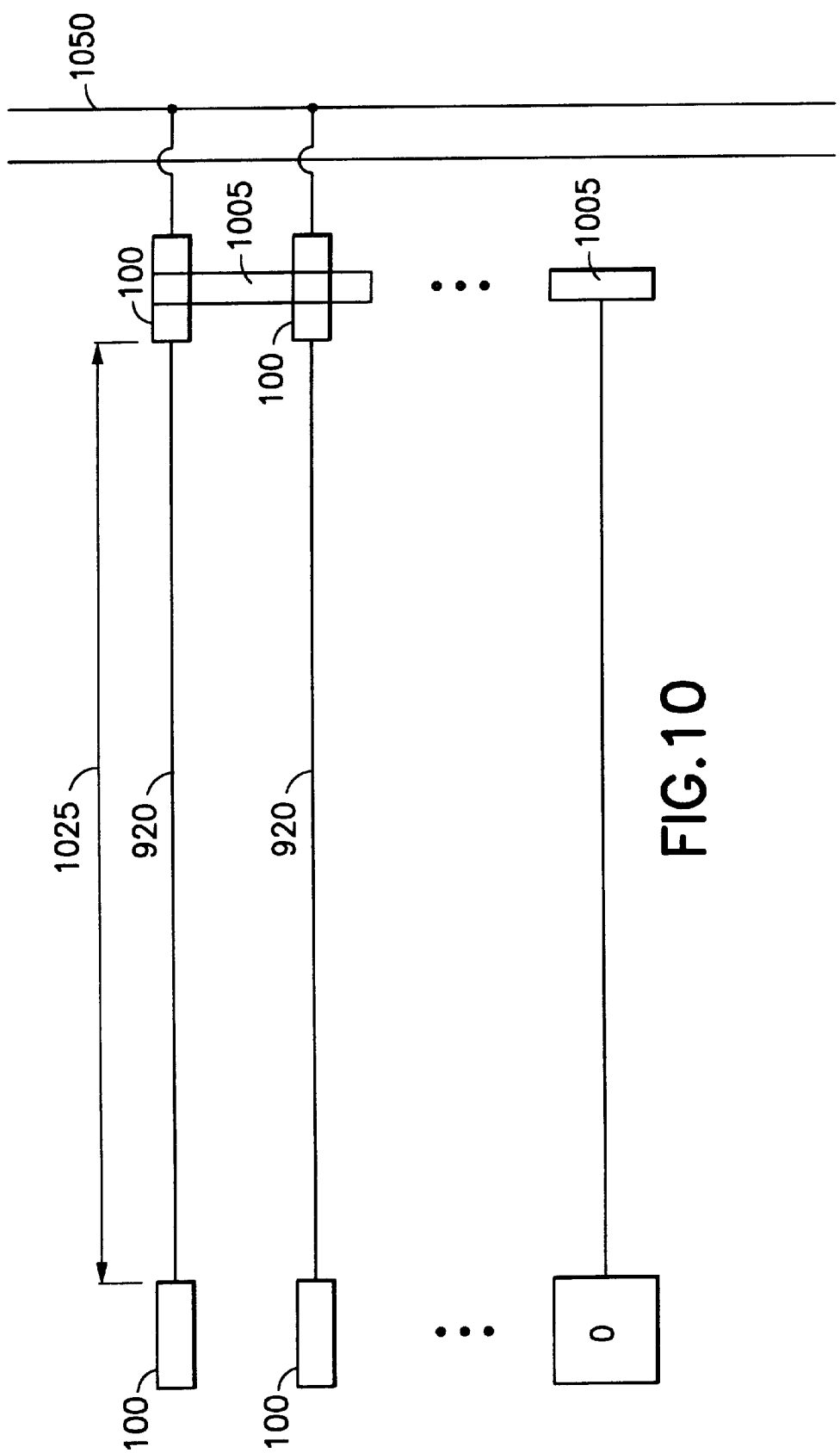
FIG. 10 is a block diagram showing detail of the power connections to the matrix of node switches in FIG. 9.

FIG. 10 is a block diagram showing detail of the power connections 920 to the matrix of node switches 100 (300) in FIG. 9. As stated before, to increase isolation between each node switch 100 (300) and the power bus 1050, each node switch 100 (300) is individually connected by a power cable 920. In addition, each of the power connectors 920 has a length 1025 that is long enough to create an inductance to suppress high frequency feedback. In a preferred embodiment, this length 1025 is between eight and thirty inches. In addition, each conductor 920 passes through a well known ferromagnetic isolation strip 1005. In one preferred embodiment, the isolation strip 1005 uses a ferromagnetic suppression strip. In a preferred embodiment, the isolation strip 1005 is a Header Filter Block 16-pin, product number FB3800X, manufactured by ParaCon.

Figure 11:
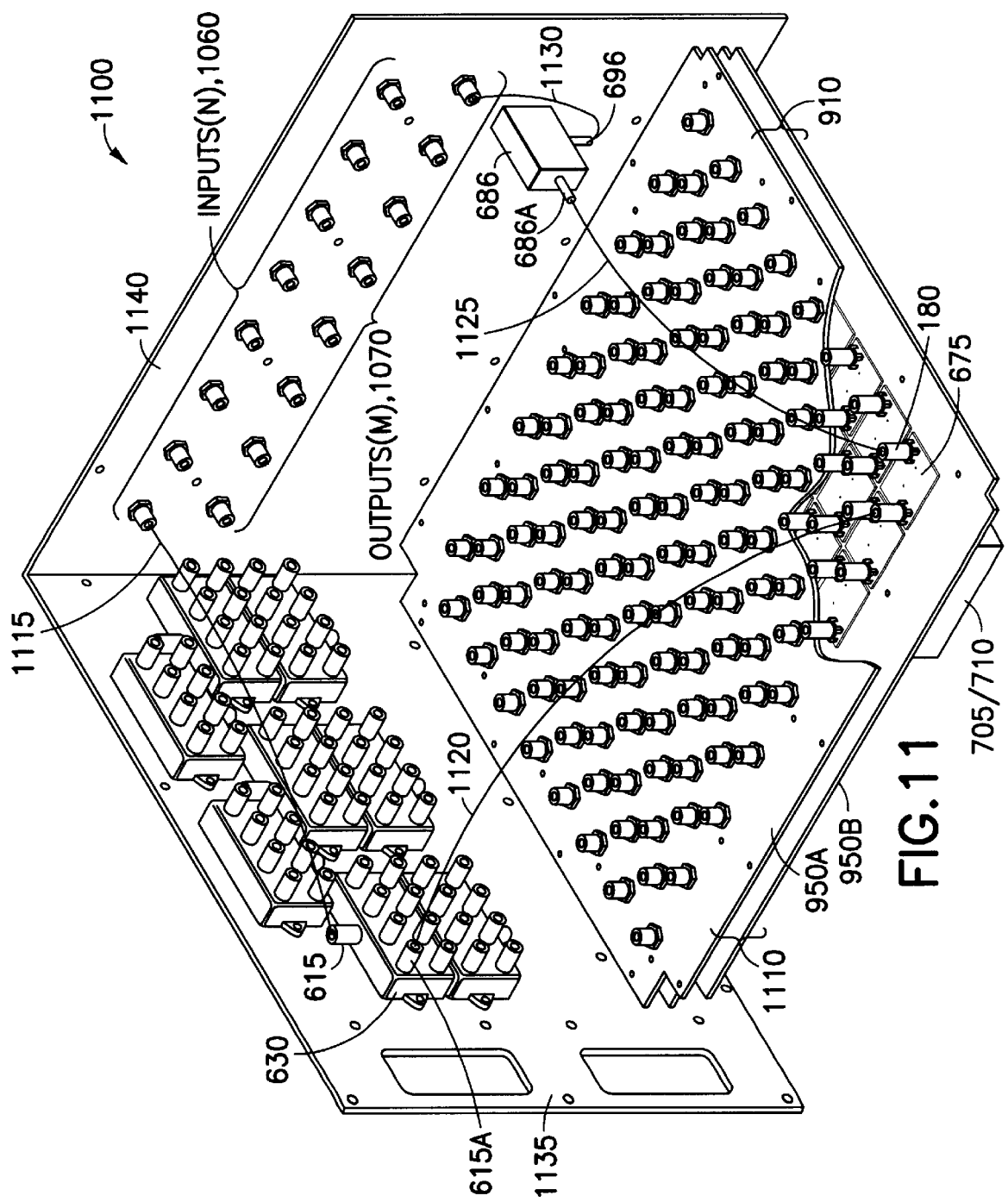
FIG. 11 is a isometric cut away view of one preferred embodiment of a physical configuration of the N×M matrix switch with a matrix of node switches in a shielded chamber.

FIG. 11 is a isometric cut away view of one preferred embodiment of a physical configuration of the N×M matrix switch 600 with a matrix of node switches 100 (300) in a shielded chamber 910. In a preferred embodiment, the matrix switch 600 is physically arranged in a box structure 1100 having the first and second conducting mounting plates 950A, 950B enclosing shielding chamber 910 as a node switch side 1110 side of the box 1100. Another side of the box 1135, called the splitter side, is perpendicular to the node switch side 1110 and has the splitters, typically 630, physically mounted on it. Another side of the box, called the rear panel 1140, is perpendicular to both the node switch side 1110 and the splitter side 1135 and has a set of N inputs 1060 and M outputs 1070 attached to it. Another side, called a combiner side, (not shown for clarity) is perpendicular to both the node switch side 1110 and the rear panel 1140 and is opposite the splitter side 1135 and has combiners, typically 686, physically mounted on it. Another side, called the front panel (not shown), is parallel and opposite the rear panel 1140. A top and a bottom panel (also not shown) can be provided to fully enclose and environmentally protect the components internal to the box 1100. Note that while the box is shown in a cubical configuration, any other geometric shape or enclosure can be used. Further, each of the sides 1110, 1135, and 1145, etc. are electrically connected to the first and second conducting mounting plates 950A, 950B to provide a fully grounded container 1100. FIG. 11 shows one typical connection between and input "In" through shielded connection 1115, to the splitter input 615, from the splitter output 615A through shielded connection 1120, to an input 102 of the node switch 675/100 (300), to the output 180 of the node switch 675 through shielded connection 1125, to a given input 686A of the combiner 686, to the output 696 of the combiner 686, and finally, through connection 1130 to the given output Om 1070. Note that controller 705 and/or digital control logic 710 is located under the second conducting mounting plate 950B for isolation as described above.

Figure 12:
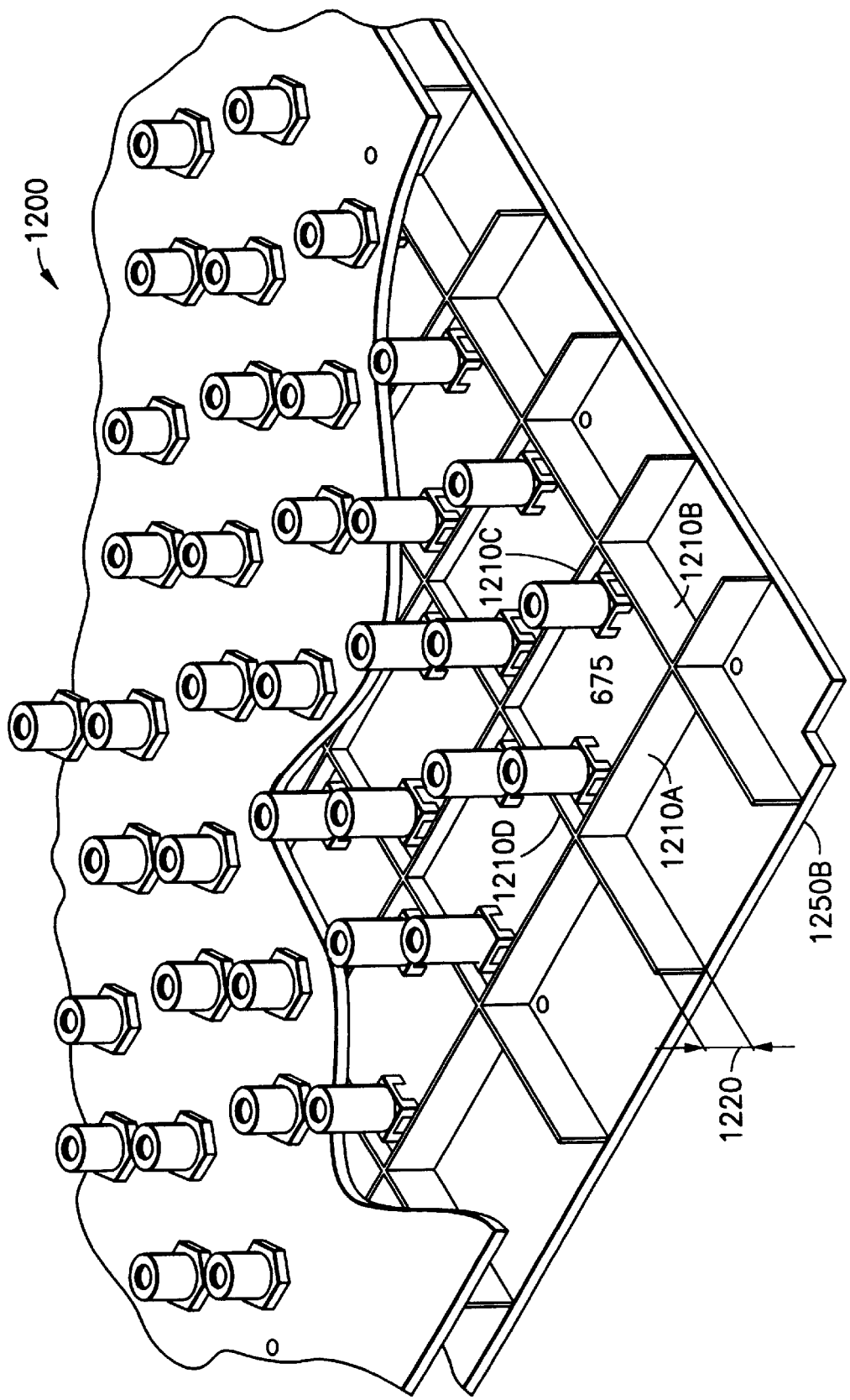
FIG. 12 is a block diagram of one preferred embodiment of a node isolation shielding plate.

FIG. 12 is a block diagram of an alternative embodiment 1200 of the second conducting mounting plate 950B. In this embodiment, the second conducting mounting plate 1250B has conducting shielding barriers compartmentalizing each of the node switches, typically 675. In a preferred embodiment, each side of the node switch 675/100 (300) is blocked by a wall (1210A, 1210B, 1210C, and 1210B, typically 1210). These walls 1210 are preferably perpendicular to the shielding plate 1250 and are on the order of height 1220 between 0.25 and 0.375 inches high, more preferably 0.5 inches high. In an alternative preferred embodiment, the walls 1210 form a barrier that completely encloses the node switch, i.e. they have a height 1220 equal to the distance 961 between the first conducting mounting plate 950A and the second conducting mounting plate 1250B. These walls 1210 are used to further isolate the electromagnetic energy produced at each of the node switches 100 (300) from the other node switches 100 (300) in the matrix switch 600.

The matrix switch 600 has multiple uses because of its ability to dynamically connect and/or disconnect broadband networks, combine and/or split broadband signals, switch and/or combine any of one or more broadband inputs to any of one or more broadband outputs, and to perform this switching with a constant proportional power level with respect to a given input power level, with low noise and high signal isolation.

For example, suppose there are locations, e.g. Shrub Oak, Katonah, and Yorktown, New York, each connected to one of the inputs (In) to the matrix switch 600, which are serviced by a single cable TV head-end. The matrix switch 600 can isolate one of the locations (e.g. Shrub Oak) from the other two by placing the appropriate control signals 370 on the matrix switch 600 to switch the Shrub Oak input to one output O1 and to combine the other two on a second output O2.

Further, suppose that the Shrub Oak and Katonah locations contain noise on the cable system while the Yorktown location is quiet. The matrix switch 600 can isolate the Shrub Oak location from the Katonah location and, optionally, combine one of the locations with the Yorktown location by placing the appropriate control signals 370 on the matrix switch 600. This is desirable to reduce the cumulative noise at any one location. Cumulative noise reduction is necessary on a cable system where the system locations are equipped with a large number of cable modems. Cable modems typically operate within a band range of 5–50 MHz (which is highly susceptible to noise) and require a high signal to noise ratio within their band range. As stated above, the matrix switch 600 can provide a capability to isolate noisy locations of the network from each other so that a low signal to noise ratio of one location does not adversely effect the signal to noise ratio of a second.

Network bandwidth usage can change over time on a daily basis. Business sectors and residential sectors may have different bandwidth requirements during day vs. night. The matrix switch 600 can be used to dynamically combine and isolate different neighborhoods based on peak vs. off-peak times of day. Further, network bandwidth usage or requirements can vary unpredictably over time. The matrix switch 600 can also be used to dynamically combine and isolate different neighborhoods based on sensed or monitored network traffic demands.

Noise may also be predictable on an hourly basis (people coming home using stoves, fans, lights, heaters, televisions) and the noise characteristics of a broadband network can change over time. As above, the matrix switch 600 can be used to dynamically combine and isolate different neighborhoods based on their historical noise characteristics.

Further, one or more outputs Om of the matrix switch 600 can be used as test points to monitor the broadband signals on broadband networks. The matrix switch 600 can dynamically switch and combine one or more input signals (In) of broadband networks to the test output Om. A monitoring device such as a spectrum analyzer or a signal level meter attached to the test output Om can monitor the combined broadband signals. Insertion loss of the matrix switch 600 into one or more broadband networks is invariant and does not change as the matrix switch state is changed. That is, no matter which inputs are connected to which outputs, there is a constant insertion loss for the matrix switch between any given input and output. Therefore, if when an input (In) is connected to a test output Om, the signal characteristics between that input and all other outputs does not change and an accurate presentation of the signal is sent to the test output. Without the matrix switch 600 in the system, this function would have to be performed by manually disconnecting lines which could change the characteristic of the network and therefore make it more difficult to find problems.

Given this disclosure alternative equivalent embodiments will become apparent to those skilled in the art. These embodiments are also within the contemplation of the inventors.

We claim:

1. A broadband matrix switch comprising:
   N number of broadband inputs, each broadband input having one or more broadband signals;
   M number of broadband outputs;
   N number of splitters, each splitter having a splitter input connected to one of the broadband inputs, the splitter having M number splitter outputs having splitter output signals;
   a node switch connected to each of the splitter outputs, the node switch having a control input that allows the node switch to pass the respective splitter output signal upon receiving a close command at the control input and to terminate the respective splitter output signal with an input impedance upon receiving an open command at the control input;
   M number of combiners, each combiner having a combiner output connected to one of the broadband outputs, and each combiner further having N number of combiner inputs, each of the combiner inputs connected to one and only one of the inputs through the respective splitter and node switch, the node switch further terminating the combiner input with an output impedance upon receiving an open command; and
   a controller sending one or more open commands to selected node switches to connect one or more of the broadband inputs to one or more of the broadband outputs.

2. A broadband matrix switch, as in claim 1, where input impedance is equal to a characteristic impedance of the respective broadband input.

3. A broadband matrix switch, as in claim 1, where output impedance is equal to a characteristic impedance of the respective broadband output.

4. A broadband matrix switch, as in claim 1, where the controller is any one of the following: a computer, a manual switch network, and a hardware logic.

5. A broadband matrix switch, as in claim 1, where one or more of the broadband inputs include any one or more of the following: a broadband signal, one or more television signals, one or more FM radio signals, one or more forward data signals, one or more forward control signals, one or more return signals from a set top box, one or more return data signals from a set top box, one or more return control signals from a set top box, and one or more return data signals from a cable modem.

6. A broadband matrix switch, as in claim 1, where one or more of the broadband outputs include any one or more of the following: a broadband signal, one or more television signals, one or more FM radio signals, one or more forward data signals, one or more forward control signals, one or more return signals from a set top box, one or more return data signals from a set top box, one or more return control signals from a set top box, and one or more return data signals from a cable modem.

7. A broadband matrix switch, as in claim 1, where the controller sends commands connecting one broadband input to one or more broadband outputs.

8. A broadband matrix switch, as in claim 1, where the controller sends commands connecting two or more broadband inputs to one or more of the broadband outputs, being combined outputs, so that a first broadband signal on one of the broadband inputs and a second broadband signal on another broadband input are combined on each of the combined outputs.

9. A broadband matrix switch, as in claim 1, where the power loss between any input and any output is constant irrespective of a configuration of the broadband inputs connected to the broadband outputs.

10. A broadband matrix switch, as in claim 1, where two of the broadband inputs that contain a high amount of noise are separated by the broadband matrix switch so that they appear on separate broadband outputs.

11. A broadband matrix switch, as in claim 1, where one of the broadband inputs is connected to a first broadband output during a first time period and a second broadband output during a second time period.

12. A broadband matrix switch, as in claim 11, where the broadband input is switched from the first broadband output to the second broadband output to level peak network loading.

13. A broadband matrix switch, as in claim 1, where a first broadband input is connected to a first broadband output so that monitoring equipment connected at the first broadband output can monitor the first broadband input.

14. A method of connecting one or more broadband inputs of a broadband matrix switch to one or more broadband outputs of the matrix switch, comprising the steps of:
   determining whether a received command is any one of a JOIN, REMOVE, and APPLY command;
   creating a pattern of zero or more JOIN commands and zero or more REMOVE commands, the JOIN commands each identifying a connection connecting a broadband input to a broadband output, and the REMOVE commands each identifying a disconnection disconnecting a broadband input from a broadband output in the broadband matrix switch;

executing the APPLY command to configure the broadband matrix switch so that every connection and disconnection in made.

15. A method of connecting one or more broadband inputs of a broadband matrix switch to one or more broadband outputs of the matrix switch, as in claim 14, further comprising the step of:

executing a SAVE command that saves the pattern to a memory.

16. A method of connecting one or more broadband inputs of a broadband matrix switch to one or more broadband outputs of the matrix switch, as in claim 14, further comprising the step of:

executing a CLEAR command that clears one of the patterns from a memory.

17. A method of connecting one or more broadband inputs of a broadband matrix switch to one or more broadband outputs of the matrix switch, as in claim 14, further comprising the step of:

executing an AUTO-APPLY command that executes each JOIN and REMOVE command when received.

18. A method of connecting one or more broadband inputs of a broadband matrix switch to one or more broadband outputs of the matrix switch, as in claim 17, where the AUTO-APPLY command is selectable.

19. A method of connecting one or more broadband inputs of a broadband matrix switch to one or more broadband outputs of the matrix switch, as in claim 14, further comprising the step of:

where an AUTO-APPLY command replaces the APPLY command, the AUTO-APPLY command executing each JOIN and REMOVE command when received.

20. A broadband matrix switch comprising:

a means for determining whether a received command is any one of a JOIN, REMOVE, and APPLY command;

a means for creating a pattern of zero or more JOIN commands and zero or more REMOVE commands, the JOIN commands each identifying a connection connecting a broadband input to a broadband output, and the REMOVE commands each identifying a disconnection disconnecting a broadband input from a broadband output in the broadband matrix switch;

a means for executing the APPLY command to configure the broadband matrix switch so that every connection and disconnection in made.

\* \* \* \* \*